(12) United States Patent
Wilke et al.

(10) Patent No.: US 8,590,567 B2
(45) Date of Patent: Nov. 26, 2013

(54) VALVE BLOCK ASSEMBLY

(75) Inventors: Andrew Paul Wilke, Madison, WI (US); Robert Charles Mierendorf, Verona, WI (US); Anthony Charles Grabski, Blue Mounds, WI (US); Cunjiang Cheng, Madison, WI (US)

(73) Assignee: Semba Biosciences, Inc., Madison, WI (US)

( * ) Notice: Subject to any disclaimer, the term of this patent is extended or adjusted under 35 U.S.C. 154(b) by 0 days.

(21) Appl. No.: 13/488,842

(22) Filed: Jun. 5, 2012

(65) Prior Publication Data

US 2012/0241034 A1    Sep. 27, 2012

Related U.S. Application Data

(63) Continuation of application No. 12/194,927, filed on Aug. 20, 2008, now Pat. No. 8,196,603.

(51) Int. Cl.
*F16K 7/00* (2006.01)

(52) U.S. Cl.
USPC .............. 137/597; 137/833; 251/61; 422/70; 422/503; 436/52; 436/162; 210/198.2; 210/656

(58) Field of Classification Search
USPC ............ 137/597, 594, 833; 422/70, 502, 503; 251/61; 210/198.2, 137, 741, 656, 808; 436/52, 161, 162
See application file for complete search history.

(56) References Cited

U.S. PATENT DOCUMENTS

| | | | |
|---|---|---|---|
| 2,677,390 A * | 5/1954 | Davis et al. | 137/594 |
| 3,111,849 A * | 11/1963 | Broerman | 73/863.71 |
| 3,312,238 A * | 4/1967 | Voit, Jr. | 137/552.5 |
| 4,109,922 A | 8/1978 | Martin | |
| 4,119,120 A | 10/1978 | Mehaffy et al. | |
| 4,353,243 A * | 10/1982 | Martin | 73/23.42 |
| 4,434,051 A | 2/1984 | Golem | |
| 4,511,150 A | 4/1985 | Seguenot | |
| 4,614,204 A | 9/1986 | Dolejs | |
| 4,614,205 A | 9/1986 | Oroskar | |
| 4,625,763 A | 12/1986 | Schick et al. | |
| 4,632,149 A | 12/1986 | Oroskar et al. | |
| 4,633,904 A | 1/1987 | Schumann et al. | |
| 4,705,627 A | 11/1987 | Miwa et al. | |
| 4,764,276 A | 8/1988 | Berry et al. | |

(Continued)

OTHER PUBLICATIONS

International Preliminary Report on Patentability for International Application No. PCT/US2009/051934 mailed Mar. 3, 2011 (7 pages).

(Continued)

*Primary Examiner* — Eric Keasel
*Assistant Examiner* — Minh Le
(74) *Attorney, Agent, or Firm* — Foley & Lardner, LLP

(57) ABSTRACT

A device to enhance sealing is provided. The device includes a body and a pressure cup. The pressure cup includes a channel, a first pressure channel, and a second pressure channel. The channel is formed in a surface of the body to surround a first portion of the surface. The channel is configured to hold an o-ring. The first pressure channel extends through the body and opens into the first portion of the surface. The second pressure channel extends through the body and opens into the channel. Pneumatic pressure within the second pressure channel is controlled to hold the o-ring in the channel when a second pressure within the first pressure channel changes.

11 Claims, 26 Drawing Sheets

(56) References Cited

U.S. PATENT DOCUMENTS

| | | | |
|---|---|---|---|
| 4,808,317 A | 2/1989 | Berry et al. | |
| 4,852,851 A | 8/1989 | Webster | |
| 4,923,616 A | 5/1990 | Hirata et al. | |
| 5,172,728 A | 12/1992 | Tsukazaki | |
| 5,203,368 A | 4/1993 | Barstow et al. | |
| 5,320,811 A * | 6/1994 | Mount et al. | 422/70 |
| 5,395,879 A | 3/1995 | Murray | |
| 5,429,374 A | 7/1995 | Eichenberger | |
| 5,465,748 A | 11/1995 | Bowers | |
| 5,565,104 A | 10/1996 | Priegnitz | |
| 5,635,072 A | 6/1997 | Moran | |
| 5,676,826 A | 10/1997 | Rossiter et al. | |
| 5,705,061 A | 1/1998 | Moran | |
| 5,765,591 A * | 6/1998 | Wasson et al. | 137/597 |
| 5,833,245 A | 11/1998 | Gallagher | |
| 6,112,767 A * | 9/2000 | Pinkham | 137/597 |
| 6,123,849 A | 9/2000 | Purdom | |
| 6,146,537 A | 11/2000 | Ferschneider et al. | |
| 6,182,973 B1 * | 2/2001 | Schertler | 277/389 |
| 6,261,458 B1 | 7/2001 | Callebert et al. | |
| 6,284,134 B1 | 9/2001 | Ferschneider et al. | |
| 6,402,959 B1 | 6/2002 | Dessapt et al. | |
| 6,453,725 B1 * | 9/2002 | Dahlgren et al. | 73/23.42 |
| 6,508,938 B2 | 1/2003 | Maiefski et al. | |
| 6,544,413 B1 | 4/2003 | Nagamatsu et al. | |
| 6,548,895 B1 * | 4/2003 | Benavides et al. | 257/712 |
| 6,632,200 B2 | 10/2003 | Potter et al. | |
| 6,719,001 B2 | 4/2004 | Ahlgren et al. | |
| 6,742,544 B2 * | 6/2004 | Bergh et al. | 137/885 |
| 6,779,557 B2 | 8/2004 | Weiss | |
| 6,797,175 B2 | 9/2004 | Hotier | |
| 6,843,854 B2 | 1/2005 | Farrenburg et al. | |
| 6,951,340 B2 | 10/2005 | Suzuki et al. | |
| 6,979,402 B1 | 12/2005 | Sprague et al. | |
| 7,090,459 B2 | 8/2006 | Bhate et al. | |
| 7,134,671 B2 | 11/2006 | Duke et al. | |
| 7,216,528 B2 | 5/2007 | Gamache et al. | |
| 7,220,356 B2 | 5/2007 | Thommes et al. | |
| 7,544,293 B2 * | 6/2009 | Oroskar et al. | 210/198.2 |
| 7,554,293 B2 | 6/2009 | Horigome | |
| 7,556,966 B2 | 7/2009 | Van Erden et al. | |
| 7,588,725 B2 | 9/2009 | Ozbal et al. | |
| 7,607,641 B1 | 10/2009 | Yuan | |
| 7,790,040 B2 | 9/2010 | Mierendorf et al. | |
| 7,806,137 B2 | 10/2010 | Larson et al. | |
| 2002/0127146 A1 * | 9/2002 | Bergh et al. | 422/89 |
| 2005/0098962 A1 | 5/2005 | Duclos et al. | |
| 2006/0185419 A1 * | 8/2006 | Gamache et al. | 73/23.41 |
| 2007/0131615 A1 | 6/2007 | Moran et al. | |
| 2008/0053543 A1 | 3/2008 | Baier et al. | |

OTHER PUBLICATIONS

International Search Report and Written Opinion for International Application No. PCT/US2007/019126 mailed Mar. 4, 2008 (9 pages).

International Search Report and Written Opinion for International Application No. PCT/US2009/051934 mailed Oct. 2, 2009 (9 pages).

Non-Final Office Action issued in U.S. Appl. No. 12/194,927 dated Jun. 27, 2011 (6 pages).

Non-Final Office Action issued in U.S. Appl. No. 12/194,927 dated Sep. 7, 2011 (14 pages).

Notice of Allowance issued in U.S. Appl. No. 12/194,127 dated Feb. 16, 2012 (7 pages).

* cited by examiner

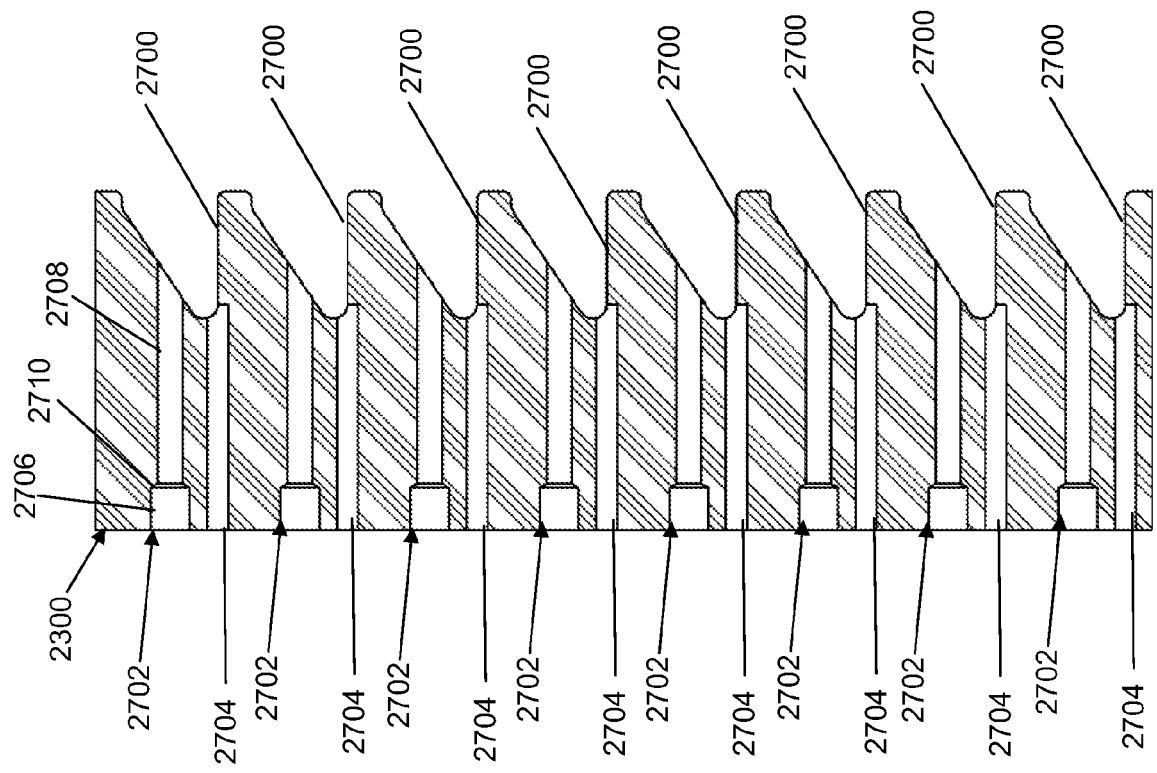

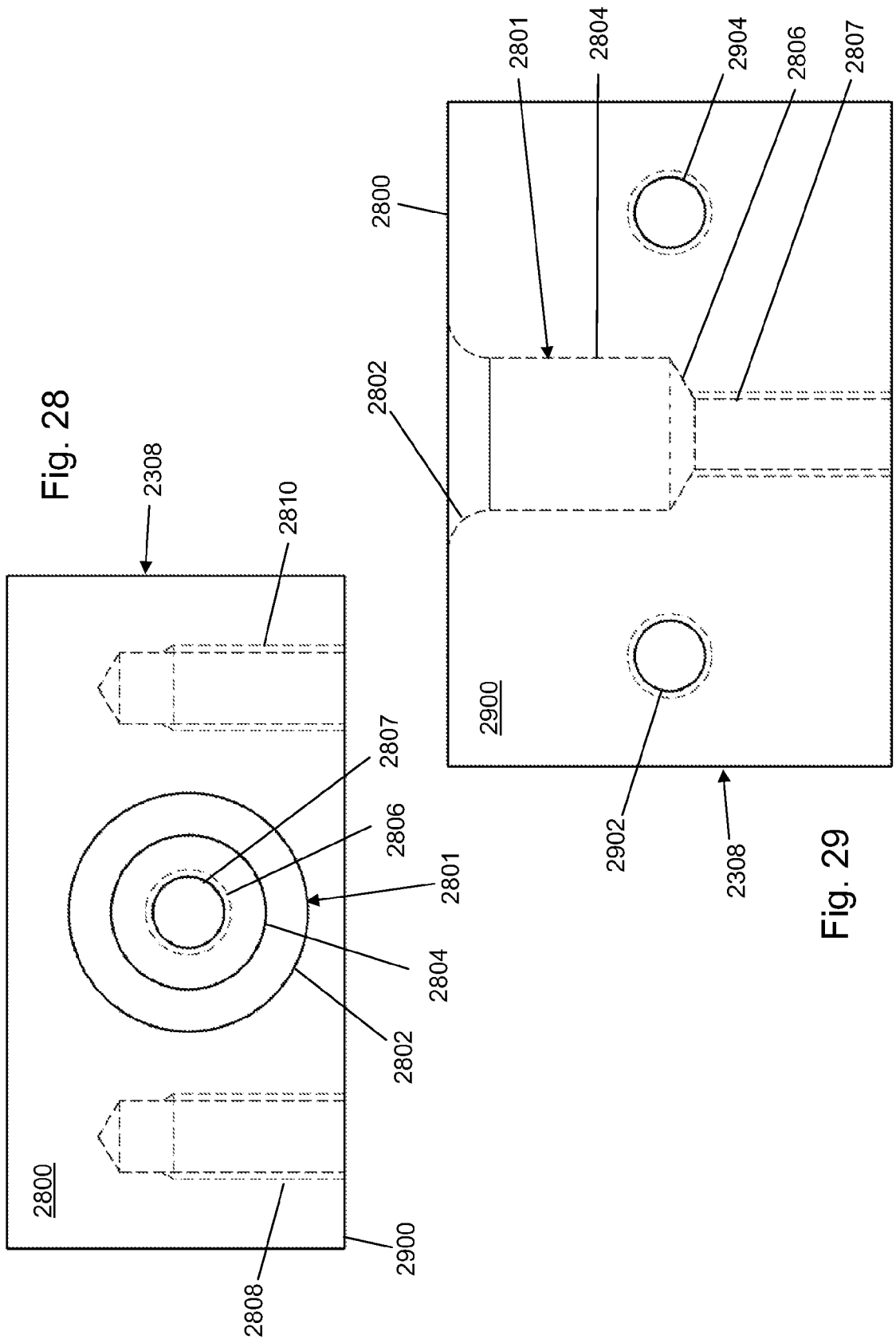

US 8,590,567 B2

VALVE BLOCK ASSEMBLY

CROSS REFERENCE TO RELATED APPLICATIONS

The present application is a continuation of U.S. patent application Ser. No. 12/194,927, filed Aug. 20, 2008, now allowed, issuing on Jun. 12, 2012, as U.S. Pat. No. 8,196,603 and is hereby incorporated by reference in its entirety.

BACKGROUND

Simulated moving bed chromatography (SMB) utilizes a number of interconnecting separation beds containing solid phase chromatography substrates. Inlet ports for feedstock and desorbent and outlet ports for raffinate and extract are placed at specific points in the series of separation beds, and a series of valves and tubing and/or channels connects flow to provide a continuous loop. Liquid flow is controlled by two or more pumps connected to the inlet and/or outlet streams. At defined intervals, the positions of the inlet and outlet ports are switched in the same direction as the flow, simulating a countercurrent movement of the solid phase beds relative to the fluid streams. Feedstock introduced into the first bed begins to separate into components contained therein as flow ensues, with less retained species migrating in the direction of fluid flow and being collected at the raffinate port. The more retained species remain preferentially associated with the solid phase and are collected at the extract port. By regulating the switch times and flow rates of feedstock, desorbent, raffinate, and extract, a standing wave pattern is established, allowing for continuous flow of purified products from the system.

The principle of continuous countercurrent chromatography relies on the phenomenon of preferential retention on an immobilized sorbent substrate of one or more substances in a feedstock mixture, separation of less retained substances, and subsequent recovery of the separated substances. In standard SMB, this process is repeated in a succession of columns by switching zones of separation, enrichment, and regeneration in stepwise sequence using a valve system.

For large scale industrial systems, the bed volume is so great compared to void volumes of liquid between beds that even elaborate valve systems involving extensive conduits do not interfere with the process. There has been a recent trend, however, in scaling SMB down to pilot and sub-pilot volumes, as the need for more sophisticated applications has arisen in the fine chemicals and pharmaceutical fields requiring milligram-to-gram level quantities of product. For example, the Protein Structure Initiative is a national effort to determine the three-dimensional structure of a wide variety of proteins. This initiative will accelerate the discovery of protein function and enable faster development of new therapies for treating genetic and infectious diseases. One of the significant challenges is to develop methods of purifying target proteins from complex cell extracts in small (10-100 milligram) quantities, in high purity (greater than 90%). SMB scaled down in size promises to provide a mechanism for overcoming these challenges.

SUMMARY

In an exemplary embodiment, a device to enhance sealing is provided. The device includes, but is not limited to, a body and a pressure cup. The pressure cup includes, but is not limited to, a channel, a first pressure channel, and a second pressure channel. The channel is formed in a surface of the body to surround a first portion of the surface. The channel is configured to hold an o-ring. The first pressure channel extends through the body and opens into the first portion of the surface. The second pressure channel extends through the body and opens into the channel. Pneumatic pressure within the second pressure channel is controlled to hold the o-ring in the channel when a second pressure within the first pressure channel changes.

In another exemplary embodiment, a fluidics stack assembly is provided. The fluidics stack assembly includes, but is not limited to, an input/output (I/O) plate, fluidics plate, and a seal plate. The I/O plate includes, but is not limited to, an inlet port hole and an outlet port hole extending through the I/O plate. The fluidics plate includes, but is not limited to, a first surface comprising an inlet channel formed in the first surface and an outlet hole extending through the fluidics plate and a second surface comprising an inlet hole, the outlet hole, and a first channel formed in the second surface. The inlet channel includes the inlet hole which extends through the fluidics plate. The seal plate includes, but is not limited to, a first hole and a second hole extending through the seal plate. The I/O plate, the fluidics plate, and the seal plate are aligned and mounted to form a sealing surface between the I/O plate and the fluidics plate and between the fluidics plate and the seal plate. When aligned, the inlet port hole aligns with the inlet channel, the inlet hole aligns with the first hole, the outlet port hole aligns with the outlet hole, and the second hole aligns with the first channel to support fluid communication between the inlet port hole and the outlet port hole.

In another exemplary embodiment, a valve block assembly is provided. The valve block assembly includes, but is not limited to, a fluidics stack assembly, a membrane, and a pressure cup plate. The fluidics stack assembly includes, but is not limited to, an input/output (I/O) plate, fluidics plate, and a seal plate. The I/O plate includes, but is not limited to, an inlet port hole and an outlet port hole extending through the I/O plate. The fluidics plate includes, but is not limited to, a first surface comprising an inlet channel formed in the first surface and an outlet hole extending through the fluidics plate and a second surface comprising an inlet hole, the outlet hole, and a first channel formed in the second surface. The inlet channel includes the inlet hole which extends through the fluidics plate. The seal plate includes, but is not limited to, a first hole and a second hole extending through the seal plate. The I/O plate, the fluidics plate, and the seal plate are aligned and mounted to form a sealing surface between the I/O plate and the fluidics plate and between the fluidics plate and the seal plate. When aligned, the inlet port hole aligns with the inlet channel, the inlet hole aligns with the first hole, the outlet port hole aligns with the outlet hole, and the second hole aligns with the first channel to support fluid communication between the inlet port hole and the outlet port hole. The pressure cup plate includes, but is not limited to, a pressure cup. The pressure cup includes, but is not limited to, an o-ring, a channel formed in a surface of the pressure cup plate to surround a first portion of the surface, and a first pressure channel extending through the body and opening into the first portion of the surface. The channel is configured to hold the o-ring. The fluidics stack assembly, the membrane, and the surface of the pressure cup plate are aligned and mounted to form a sealing surface between the I/O plate and the fluidics plate, between the fluidics plate and the seal plate, between the seal plate and the membrane, and between the membrane and the surface of the pressure cup plate. When aligned, the inlet port hole aligns with the inlet channel, the inlet hole aligns with the first hole, the outlet port hole aligns with the outlet hole, and the second hole aligns with the first channel, and the first portion of the surface of the pressure cup plate surrounds the first hole and the second hole to support fluid communication between the inlet port hole and the outlet port hole under control of pressure changes within the first pressure channel.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals denote like elements.

FIG. 27 shows a cross-sectional view of a rack of the column rack assembly of FIG. 23 in accordance with an exemplary embodiment.

FIG. 28 shows a front, skeleton view of a spring block of the column rack assembly of FIG. 23 in accordance with an exemplary embodiment.

FIG. 29 shows a bottom, skeleton view of the spring block of FIG. 27 in accordance with an exemplary embodiment.

DETAILED DESCRIPTION

Figure 1:
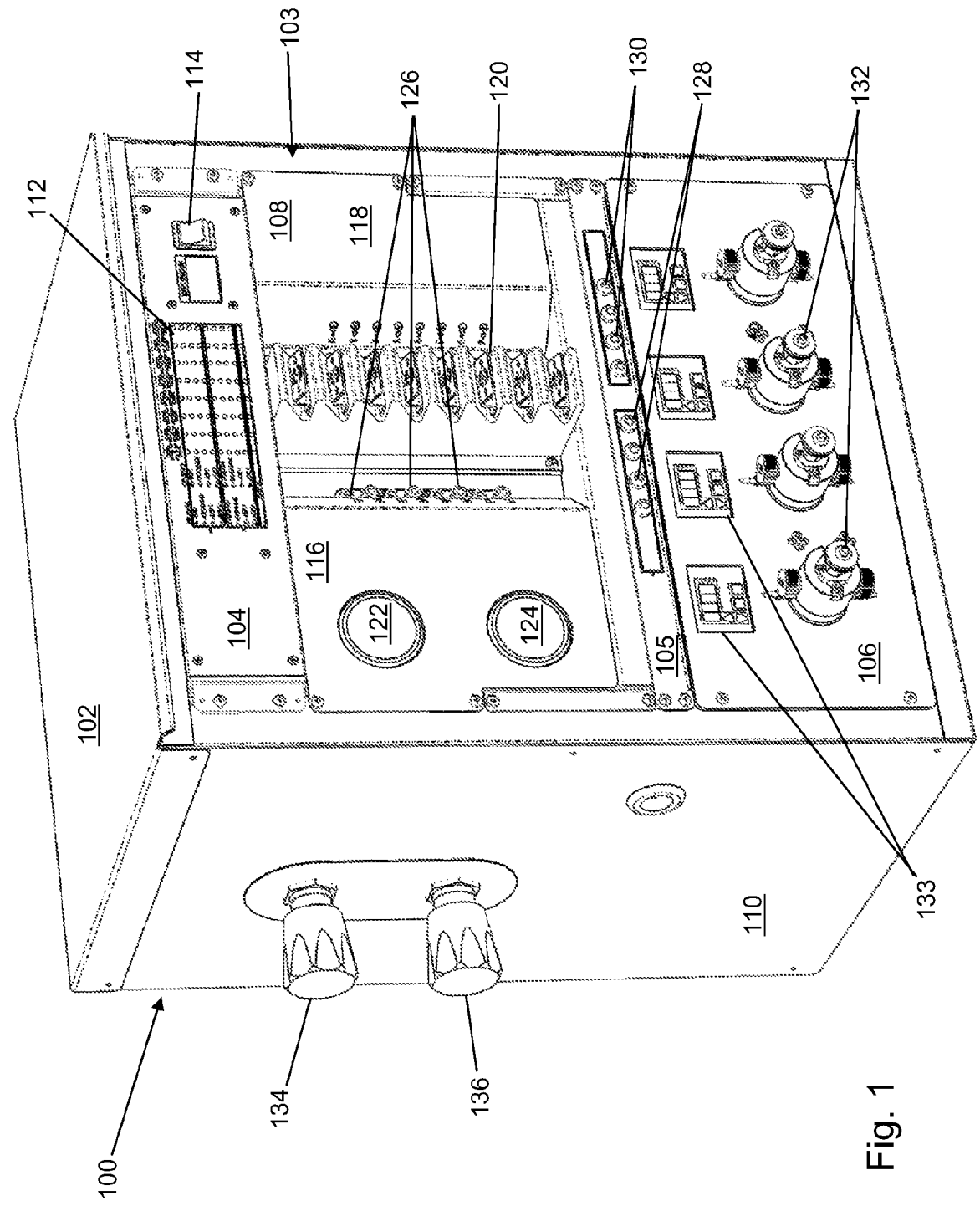
FIG. 1 shows a perspective view of an SMB system in accordance with an exemplary embodiment.

With reference to FIG. 1, a perspective view of an SMB system 100 is shown in accordance with an exemplary embodiment. SMB system 100 may include a housing 102. Housing 102 may have a variety of shapes and sizes based on the components housed therein. In the exemplary embodiment of FIG. 1, housing 102 has a generally cubic shape. Housing 102 may include a front side panel 103 and a left side panel 110 in addition to other panels not further discussed. Front side panel 103 may include a number of panels organized to present information to the user and to provide access to various components of SMB system 100 to the user. For example, front side panel 103 may include an electronics panel 104, an inlet/outlet (I/O) port panel 105, a pump panel 106, and a valve block panel 108.

Electronics panel 104 may include a column status indicator interface 112 and an on/off switch 114. Column status indicator interface 112 indicates a status of each chromatographic column of SMB system 100. In the exemplary embodiment of FIG. 1, column status indicator interface 112 indicates a status for eight chromatographic columns shown in separate columns though any number of chromatographic columns may be used depending on the application. Using on/off switch 114, the user turns on or off SMB system 100.

I/O port panel 105 may include a plurality of inlet port connectors 128 for providing fluid to SMB system 100 and a plurality of outlet port connectors 130 for collecting fluid from SMB system 100. In the exemplary embodiment of FIG. 1, I/O port panel 105 includes four inlet port connectors 128 and four outlet port connectors 130 though any number of port connectors may be used depending on the application.

Pump panel 106 may include a plurality of pump heads 132 and a plurality of pump control interfaces 133 with a pump control interface associated with each pump head. Fluid provided to SMB system 100 can be connected to a pump head of the plurality of pump heads 132. The fluid may be provided from the plurality of pump heads 132 to an inlet port connector of the plurality of inlet port connectors 128 at an appropriate flow rate as selected by the user. The user can adjust various parameters associated with a selected pump such as the flow rate using a respective pump control interface of the plurality of pump control interfaces 133. In an exemplary embodiment, the pump head is associated with a high-pressure, piston pump. In the exemplary embodiment of FIG. 1, pump panel 106 includes four pump heads 132 though any number of pump heads may be used depending on the application. Pumps may also be controlled via a separate computer using appropriate interface hardware and software. Other types of pump, including, but not limited to peristaltic, syringe, or gear pumps can be used with the system.

Figure 2:
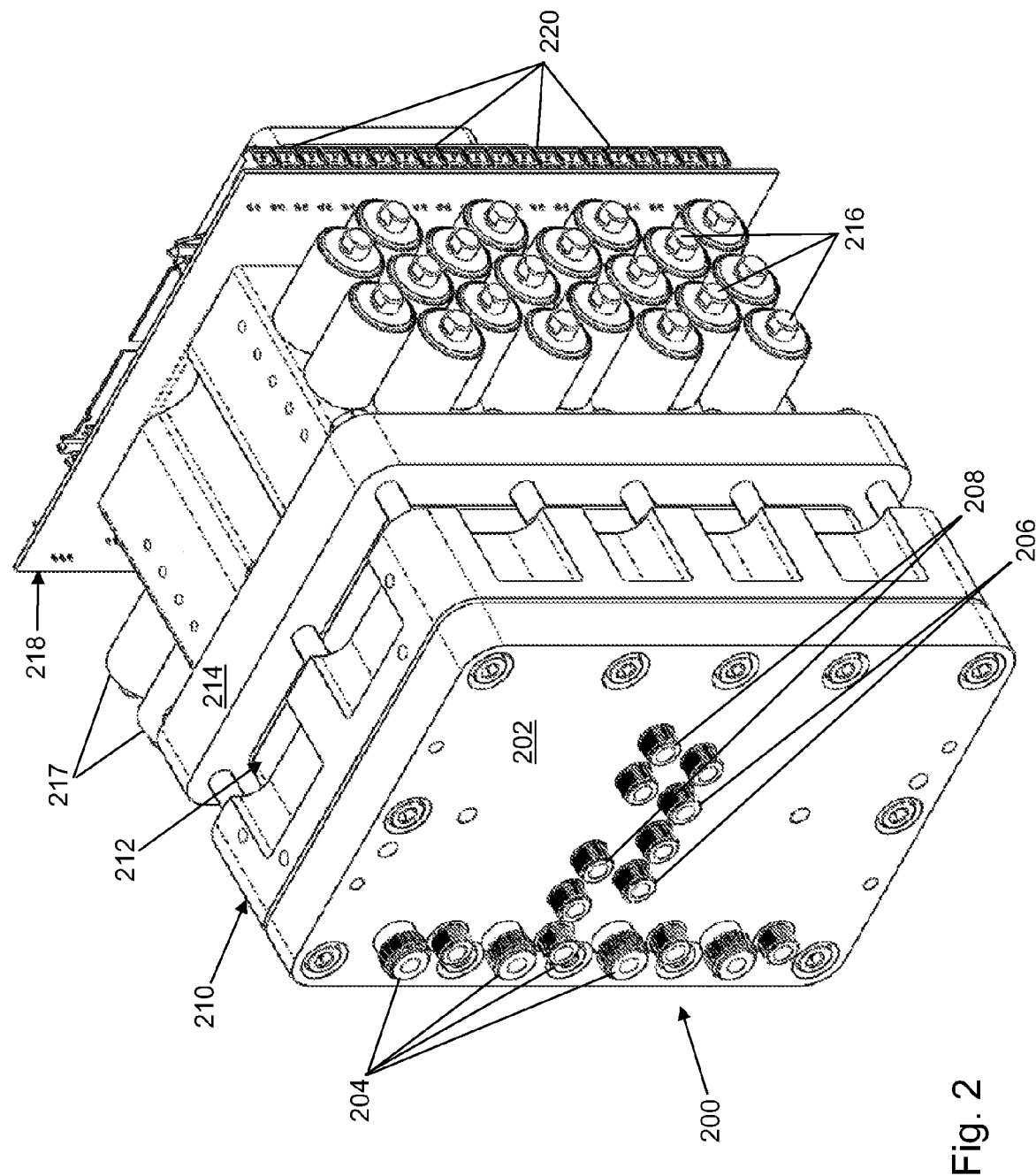
FIG. 2 shows an assembled, perspective view of a right valve block assembly of the SMB system of FIG. 1 in accordance with an exemplary embodiment.

Valve block panel 108 may include a left panel cover plate 116, a right panel cover plate 118, a column rack assembly 120, a first pressure gauge 122, a second pressure gauge 124, a first plurality of column port connectors 126, and a second plurality of column port connectors 204 (shown with reference to FIG. 2). Left panel cover plate 116 is a cover plate mounted in front of a left valve block assembly. As used herein, the term "mount" includes join, unite, connect, associate, insert, hang, hold, affix, attach, fasten, bind, paste, secure, bolt, screw, rivet, solder, weld, press against, and other like terms. Right panel cover plate 118 is a cover plate mounted in front of a right valve block assembly 200 (shown with reference to FIG. 2). Column rack assembly 120 is mounted between left side panel cover plate 116 and right panel cover plate 118. Chromatographic columns are mounted to column rack assembly 120 and are connected to the left valve block assembly using the first plurality of column port connectors 126 and to right valve block assembly 200 using the second plurality of column port connectors 204. In the exemplary embodiment of FIG. 1, column rack assembly 120 provides mounting locations for eight chromatographic columns though any number of chromatographic columns may be used depending on the application. As an example, in a typical SMB application, at least three or four chromatographic columns may be used.

First pressure gauge 122 may indicate a pressure associated with a first pneumatic pressure system, and second pressure gauge 124 may indicate a pressure associated with a second pneumatic pressure system. For example, first pressure gauge 122 may be associated with a gas pressure system for an o-ring system and second pressure gauge 124 may be associated with a gas pressure system for a valve system. In the exemplary embodiment of FIG. 1, two separate pressure systems are used; however, this is not necessary as a smaller or a larger number of pressure systems may be used.

Left side panel 110 may include a first pressure regulator 134 to control a pneumatic pressure associated with the first pressure system, and a second pressure regulator 136 to control a pneumatic pressure associated with the second pressure system. The pneumatic pressure may be provided using an inert gas pressurized tank or tanks containing either nitrogen, helium, or other suitable gas, or by a suitable air compressor.

With reference to FIG. 2, an assembled, perspective view of right valve block assembly 200 of SMB system 100 is shown in accordance with an exemplary embodiment. The left valve block assembly (not shown) behind left side panel cover plate 116 is equivalent to right valve block assembly 200, but is rotated 180 degrees relative to right valve block assembly 200. The left valve block assembly may connect through the chromatographic columns mounted to column rack assembly 120 to right valve block assembly 200. The side by side mounting of left valve block assembly and right valve block assembly 200 simplifies the connections between the valve blocks.

Right valve block assembly 200 may include a port plate 202, a pressure cup plate 210, a thermal isolation plate 212, a valve manifold 214, a first plurality of valves 216, a second plurality of valves 217, and an electronics board 218. Port plate 202 includes the second plurality of column port connectors 204, a plurality of inlet port connectors 206, and a plurality of outlet port connectors 208. The plurality of inlet port connectors 206 can be connected to the plurality of inlet port connectors 128 to provide a fluid path between the inlet port connectors. The plurality of outlet port connectors 208 can be connected to the plurality of outlet port connectors 130 to provide a fluid path between the outlet port connectors. The first plurality of valves 216 are positioned on a right side face 1900 (shown with reference to FIG. 19) of valve manifold 214 and the second plurality of valves 217 are positioned on a left side face 2000 (shown with reference to FIG. 20) of valve manifold 214 wherein the first side and the second side of valve manifold 214 face in opposite directions.

Electronics board 218 mounts to a back face of valve manifold 214. Electronics board 218 includes a plurality of electrical connectors 220 that, when connected at both ends, provide an electrical signal to the first plurality of valves 216 with each connector of the plurality of electrical connectors 220 connecting to a valve of the first plurality of valves 216. Corresponding electrical connectors are mounted to the opposite side of electronics board 218 to connect to the second plurality of valves 217. In an exemplary embodiment, the first plurality of valves 216 and the second plurality of valves 217 are solenoid valves configured to operate in a pressure range up to 300 pounds per square inch (psi). Other pressure ranges, including but not limited to 0-100 psi, 0-150 psi, 0-200 psi, 0-400 psi, and higher ranges may also be used.

Figure 3:
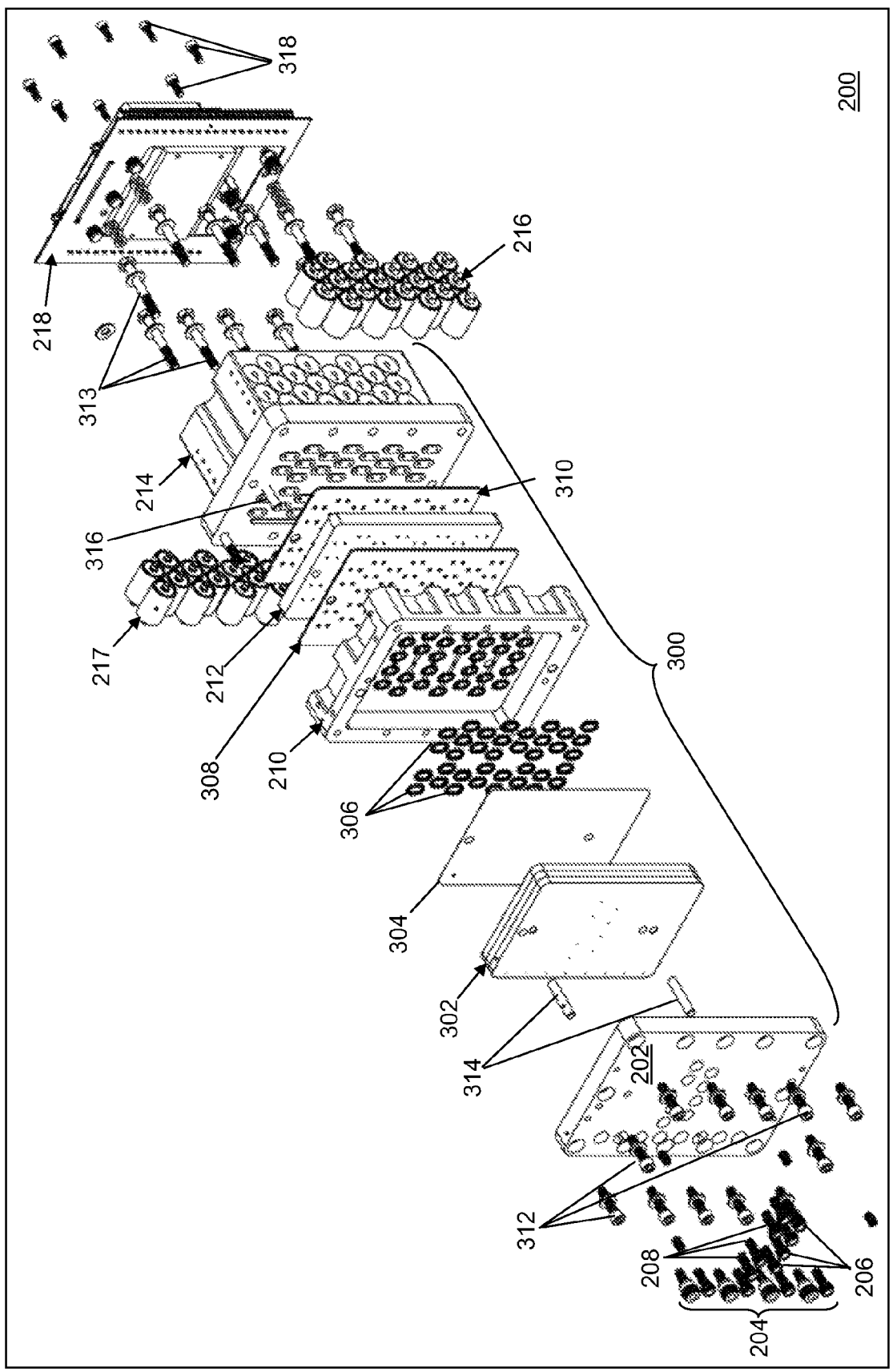
FIG. 3 shows a disassembled, exploded, perspective view of a right valve block assembly of the SMB system of FIG. 1 in accordance with an exemplary embodiment.

With reference to FIG. 3, a disassembled, exploded, perspective view of right valve block assembly 200 of SMB system 100 is shown in accordance with an exemplary embodiment. Right valve block assembly 200 may include a valve block 300, the first plurality of valves 216, the second plurality of valves 217, and electronics board 218. Valve block 300 may include port plate 202, fluidics stack assembly 302, a membrane 304, a plurality of o-rings 306, pressure cup plate 210, a first gasket plate 308, thermal isolation plate 212, a second gasket plate 310, and valve manifold 214. A plurality of first connectors 312 and second connectors 313 mount port plate 202 to pressure cup plate 210 and to valve manifold 214 to provide a sealing surface between each of the components of valve block 300. A plurality of third connectors 318 mount electronics board 218 to the back face of valve manifold 214.

The plurality of o-rings 306 are positioned within corresponding o-ring channels 1008 (shown with reference to FIG. 10) of pressure cup plate 210 to facilitate sealing between membrane 304, pressure cup plate 210, and fluidics stack assembly 302. Fluid flow within SMB system 100 is maintained between the second plurality of column port connectors 204, the plurality of inlet port connectors 206, and the plurality of outlet port connectors 208 of port plate 202 and fluidics stack assembly 302 by membrane 304. Pneumatic pressure provided to SMB system 100 is maintained between the first pneumatic pressure system and the second pneumatic pressure system and pressure cup plate 210, first gasket plate 308, thermal isolation plate 212, second gasket plate 310, and valve manifold 214 by membrane 304 which separates the fluidic and pneumatic systems of SMB system 100.

Port plate 202, fluidics stack assembly 302, membrane 304, and pressure cup plate 210 are aligned using dowel pins 314. Dowel pins 314 extend into a bore in a back face of port plate 202, through respective bores in fluidics stack assembly 302 and membrane 304, and into a bore 1012 (shown with reference to FIG. 10) in a recessed face 1000 (shown with reference to FIG. 10) of pressure cup plate 210 when properly aligned. Port plate 202, fluidics stack assembly 302, membrane 304, and recessed face 1000 of pressure cup plate 210 are mounted adjacent to each other in that order as shown with reference to FIG. 3. Fluidics stack assembly 302, and membrane 304 are positioned within a cavity formed in front face 1001 (shown with reference to FIG. 10) of pressure cup plate 210 with membrane 304 adjacent recessed face 1000 of pressure cup plate 210.

Pressure cup plate 210, first gasket plate 308, thermal isolation plate 212, second gasket plate 310, and valve manifold 214 are aligned using a first dowel pin 316 and a second dowel pin (not shown). First dowel pin 316 and the second dowel pin extend into bore 1012 in a back face 1100 (shown with reference to FIG. 11) of pressure cup plate 210, through respective bores in first gasket plate 308, thermal isolation plate 212, and second gasket plate 310, and into a bore 1802 (shown with reference to FIG. 18) in a front face 1800 (shown with reference to FIG. 18) of valve manifold 214 when the components are properly aligned. Pressure cup plate 210, first gasket plate 308, thermal isolation plate 212, second gasket plate 310, and valve manifold 214 are mounted adjacent to each other in that order as shown with reference to FIG. 3. First gasket plate 308 is mounted adjacent back face 1100 of pressure cup plate 210. Back face 1100 of pressure cup plate 210 is generally parallel to and faces in an opposite direction to front face 1000 of pressure cup plate 210.

Figure 4:
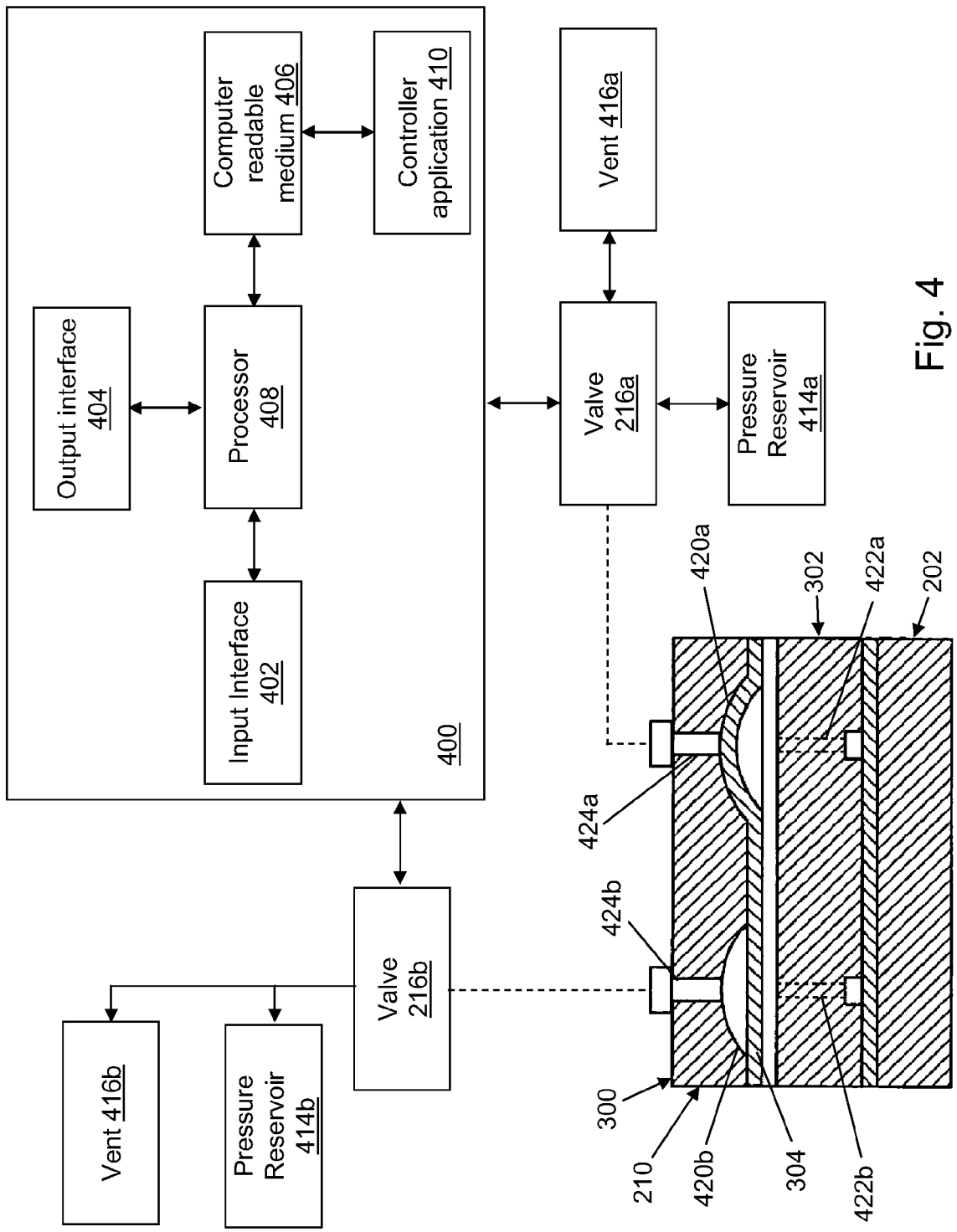
FIG. 4 shows a block diagram of a control system of the SMB system of FIG. 1 in accordance with an exemplary embodiment.

With reference to FIG. 4, a block diagram of a control system 400 of SMB system 100 is shown in accordance with an exemplary embodiment. Control system 400 controls the operation of SMB system 100 to direct the flow of fluid in a manner that simulates a moving bed. Control system 400 implements a desired process by controlling the states (open or closed) of the first plurality of valves 216 and the second plurality of valves 217 of the left valve block assembly and right valve block assembly 200 and by controlling the pumps that direct the flow of fluid in and out of SMB system 100. The components of control system 400 may be mounted to or otherwise connect to electronics board 218. Control system 400 may include an input interface 402, an output interface 404, a computer-readable medium 406, a processor 408, and a controller application 410.

Different and additional components may be incorporated into control system 400. For example, control system 400 may further include a communication interface. Components of control system 400 may be mounted to SMB system 100 or mounted in a separate device(s). As a result, the communication interface can provide an interface for receiving and transmitting data between SMB system 100 and one or more additional devices hosting components of control system 400 using various protocols, transmission technologies, and media. The communication interface may support communication using various transmission media that may be wired or wireless. Thus, the components of control system 400 may be connected as appropriate using wires or other coupling methods or wirelessly and may be positioned at various locations relative to SMB system 100 including remote to SMB system 100.

Input interface 402 provides an interface for receiving information from the user for entry into control system 400 as known to those skilled in the art. Input interface 402 may use various input technologies including, but not limited to, a keyboard, a pen and touch screen, a mouse, a track ball, a touch screen, a keypad, one or more buttons, etc. to allow the user to enter information into control system 400. SMB system 100 may have one or more input interfaces that use the same or a different interface technology.

Output interface 404 provides an interface for presenting information from control system 400 to the user as known to those skilled in the art. For example, output interface 404 may include an interface to a display, a printer, a speaker, etc. The display may be a thin film transistor display, a light emitting diode display, a liquid crystal display, or any of a variety of different displays known to those skilled in the art. The printer may be any of a variety of printers as known to those skilled in the art. The speaker may be any of a variety of speakers as known to those skilled in the art. Column status indicator interface 112 is an output interface 404 of SMB system 100. SMB system 100 may have one or more output interfaces that use the same or a different interface technology.

Computer-readable medium 406 is an electronic holding place or storage for information so that the information can be accessed by processor 408 as known to those skilled in the art. Computer-readable medium 406 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disk (CD), digital versatile disk (DVD), . . . ), smart cards, flash memory devices, etc. SMB system 100 may have one or more computer-readable media that use the same or a different memory media technology. SMB system 100 also may have one or more drives that support the loading of a memory media such as a CD, a DVD, a flash memory card, etc.

Processor 408 executes instructions as known to those skilled in the art. The instructions may be carried out by a special purpose computer, logic circuits, or hardware circuits. Thus, processor 408 may be implemented in hardware, firmware, software, or any combination of these methods. The term "execution" is the process of running an application or the carrying out of the operation called for by an instruction. The instructions may be written using one or more programming language, scripting language, assembly language, etc. Processor 408 executes an instruction, meaning that it performs the operations called for by that instruction. Processor 408 operably couples with input interface 402, output interface 404, computer-readable medium 406, controller application 410, etc. to receive, to send, and to process information and to control the operations of SMB system 100. Processor 408 may retrieve a set of instructions from a permanent memory device such as a ROM device and copy the instructions in an executable form to a temporary memory device that is generally some form of RAM. SMB system 100 may include a plurality of processors that use the same or a different processing technology.

Controller application 410 includes operations which control SMB system 100 and may provide a graphical user interface with user selectable and controllable functionality to define the processes executed by SMB system 100. The operations may be implemented using hardware, firmware, software, or any combination of these methods. With reference to the exemplary embodiment of FIG. 4, controller application 410 is implemented in software stored in computer-readable medium 406 and accessible by processor 408 for execution of the computer-readable instructions that embody the operations of controller application 410. The computer-readable instructions of controller application 410 may be written using one or more programming languages, assembly languages, scripting languages, etc. The functionality provided by controller application 410 may be distributed among one or more modules and across one or more device. For example, controller application 410 may include a module that controls the opening and closing of the first plurality of valves 216 and the second plurality of valves 217 that is separate or integrated with a module that controls pump flow rates. Controller application 410 provides control signals to the plurality of electrical connectors 220 which connect to the first plurality of valves 216 and to the plurality of electrical connectors which connect to the second plurality of valves 217 as well as to the pumps associated with the plurality of pump connectors 132.

The first plurality of valves 216 and the second plurality of valves 217 are connected to a pressure reservoir providing a pressurized gas source and to a vent. For example, with reference to FIG. 4, a first valve 216a is shown connected to a first pressure reservoir 414a and a first vent 416a, and a second valve 216b is shown connected to a second pressure reservoir 414b and a second vent 416b. First pressure reservoir 414a and second pressure reservoir 414b may be the same or different. First vent 416a and second vent 416b may be the same or different. The first plurality of valves 216 and the second plurality of valves 217 may be designed as normally open or may be designed as normally closed. Controller application 410 can be designed to support either method of valve operation. In an exemplary embodiment, the first plurality of valves 216 and the second plurality of valves 217 are normally closed and are switched at 24 volts. To reduce heat, the voltage applied to the first plurality of valves 216 and the second plurality of valves 217 may be stepped down to 12 volts or lower after switching while maintaining the state.

With reference to FIG. 4, a simplified cross sectional view of a portion of valve block 300 is shown connected to first valve 216a and to second valve 216b to illustrate the operation of the valve states. Pressure cup plate 210 includes a first recess 420a and a second recess 420b coupled to a first channel 424a and a second channel 424b, respectively. First channel 424a and second channel 424b operably couple to first valve 216a and to second valve 216b, respectively. Fluidics stack assembly 302 includes a third channel 422a and a fourth channel 422b. As shown with reference to FIG. 4, pneumatic pressure from second valve 216b applied to membrane 304 through second channel 424b stops the flow of fluid through fourth channel 422b. Pneumatic pressure released by first valve 216a through first channel 424a causes membrane 304 to deflect into first recess 420a thereby allowing the flow of fluid through third channel 422a.

Membrane 304 is formed of a polymer that is sufficiently pliant to permit deflection when pneumatic pressure is relieved in a channel such as first channel 424a. In an exemplary embodiment, membrane 304 is formed of perfluoroalkoxy copolymer resin thermoplastic material having a width of 0.01 inches though other materials and thicknesses may be used.

Figure 5:
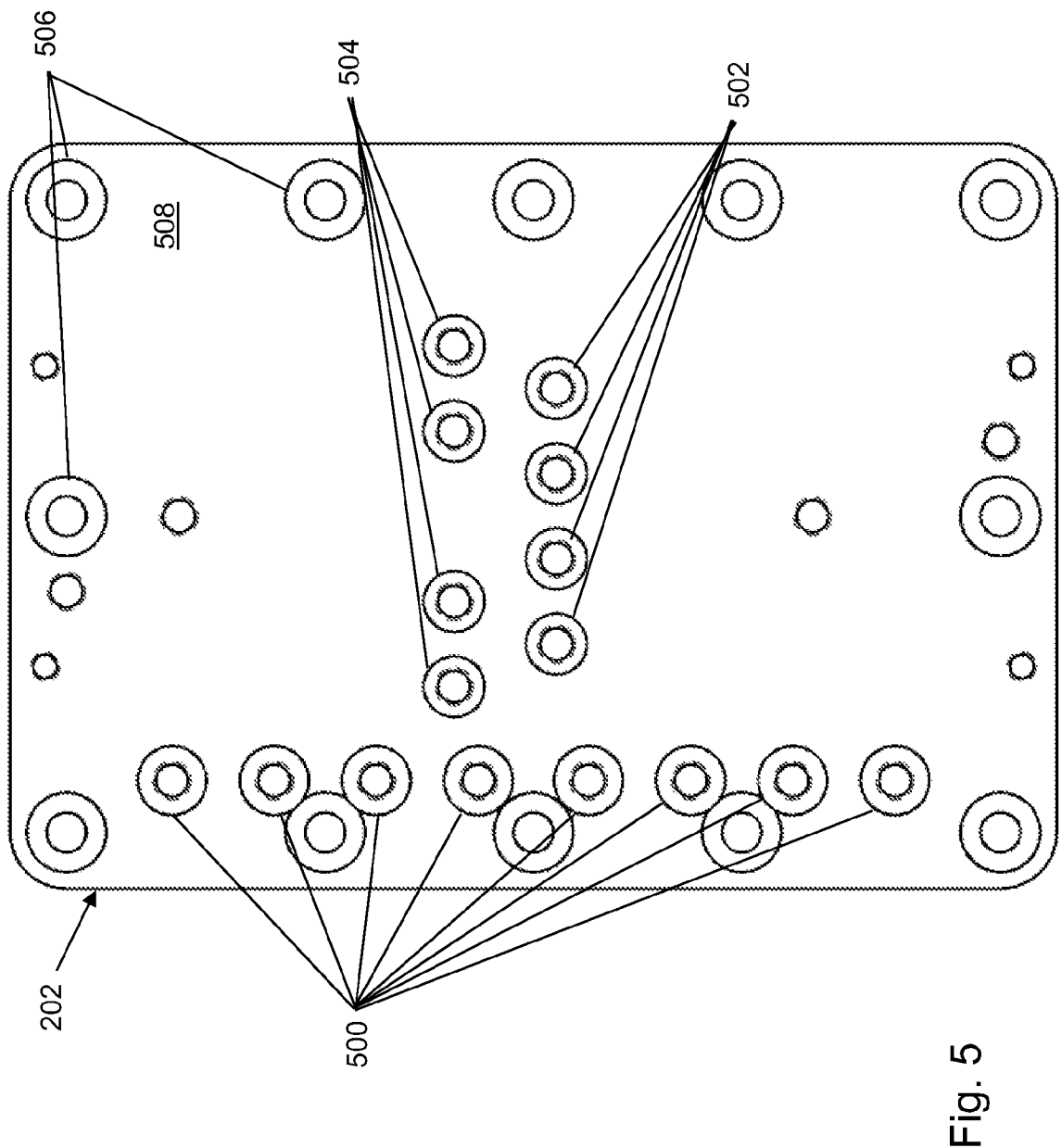
FIG. 5 shows a front view of a port plate of the right valve block assembly of FIG. 3 in accordance with an exemplary embodiment.

With reference to FIG. 5, a front view of port plate 202 is shown in accordance with an exemplary embodiment. Port plate 202 may include a plurality of column port bores 500, a plurality of inlet port bores 502, a plurality of outlet port bores 504, and a plurality of connector bores 506. The plurality of column port bores 500, the plurality of inlet port bores 502, the plurality of outlet port bores 504, and the plurality of connector bores 506 extend through a front face 508 of port plate 202 and exit a back face of port plate 202. The plurality of column port bores 500, the plurality of inlet port bores 502, and the plurality of outlet port bores 504 have a smaller circumference on the back face of port plate 202 than on front face 508 in the exemplary embodiment of FIG. 5 though this is not necessary. The second plurality of column port connectors 204 can be inserted in corresponding bores of the plurality of column port bores 500. The plurality of inlet port connectors 206 can be inserted in corresponding bores of the plurality of inlet port bores 502. The plurality of outlet port connectors 208 can be inserted in corresponding bores of the plurality of outlet port bores 504. The plurality of first connectors 312 can be inserted in corresponding bores of the plurality of connector bores 506.

In an exemplary embodiment, port plate 202 is formed of stainless steel material having a width of 0.625 inches though other materials may be used. In the exemplary embodiment of FIG. 5, port plate 202 includes eight column port bores 500 to correspond with the eight column port connectors 204, four inlet port bores 502 to correspond with the four inlet port connectors 128, and four outlet port bores 504 to correspond with the four outlet port connectors 130 though any number of bores may be used depending on the application.

Figure 6:
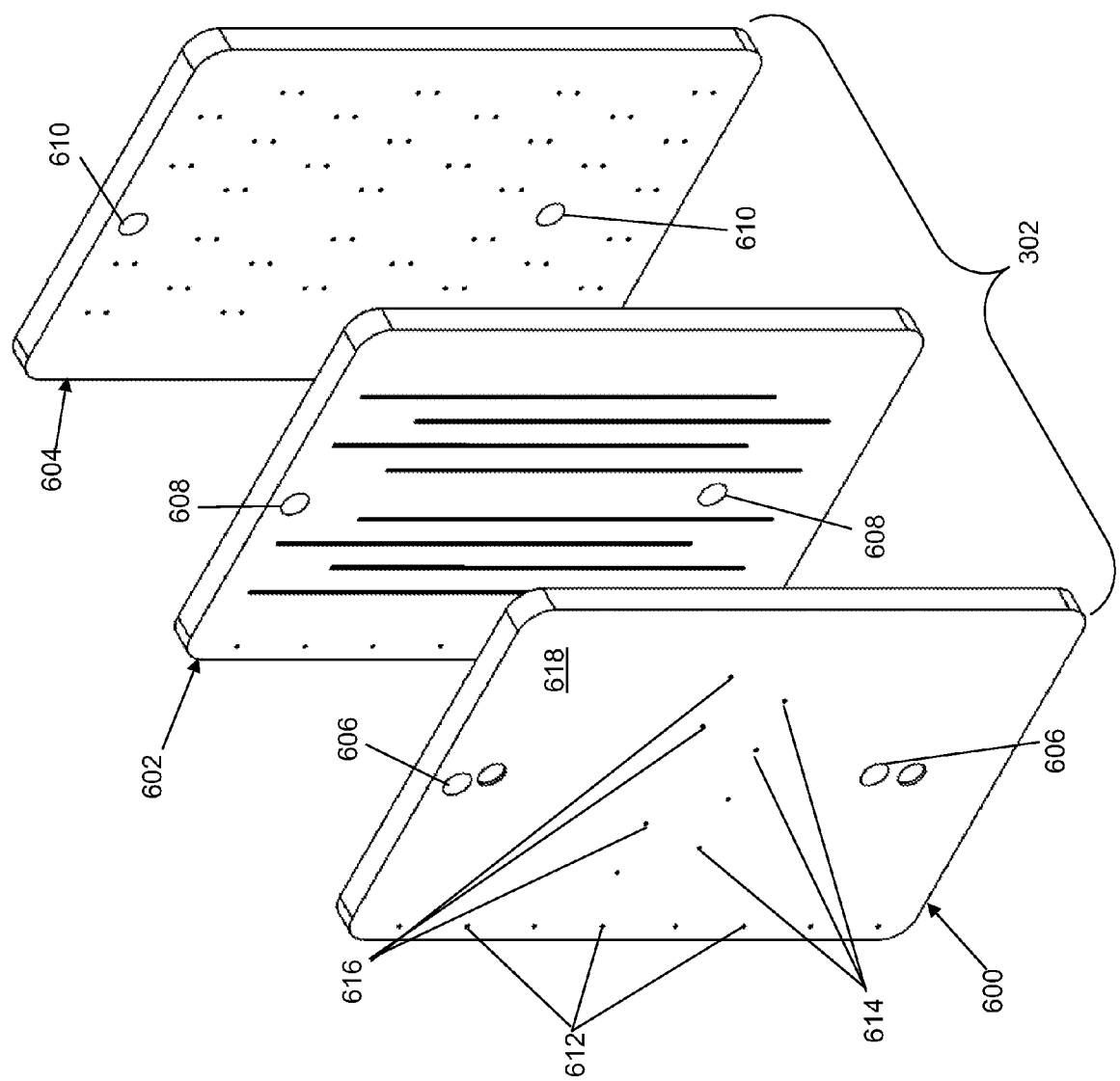
FIG. 6 shows a front, perspective view of a fluidics stack assembly of the right valve block assembly of FIG. 3 in accordance with an exemplary embodiment.

With reference to FIG. 6, a side perspective view of fluidics stack assembly 302 is shown in accordance with an exemplary embodiment. In the exemplary embodiment of FIG. 6, fluidics stack assembly 302 includes an I/O plate 600, a fluidics plate 602, and a seal plate 604. I/O plate 600 includes first dowel pin bores 606. Fluidics plate 602 includes second dowel pin bores 608. Seal plate 604 includes third dowel pin bores 610. Dowel pins 314 can be inserted in first dowel pin bores 606, second dowel pin bores 608, and third dowel pin bores 610 to properly align I/O plate 600, fluidics plate 602, and seal plate 604. In an exemplary embodiment, I/O plate 600, fluidics plate 602, and seal plate 604 may be formed of thermoplastic material. In an exemplary embodiment, I/O plate 600, fluidics plate 602, and seal plate 604 are diffusion bonded together after being properly aligned to form a single piece to minimize or even eliminate any leakage between I/O plate 600, fluidics plate 602, and seal plate 604. For example, a diffusion bonding process such as that provided by IDEX Corporation is used to diffusion bond I/O plate 600, fluidics plate 602, and seal plate 604 together. Materials that could be contemplated for fluidics stack assembly 302 include polyetherimide polyetheretherketone, polychloro-trifluoroethylene, polyphenylene sulfide, ethylene-tetrafluoroethylene, polyimide, ethylene-chlorotrifluoroethylene, pefluoroalkoxy, polytetrafluoroethylene, cyclic olefin copolymer, polyethylene, polyethylene, polyacetal, and acrylic. There are also forms of Teflon (fluorinated ethylene propylene, pefluoroalkoxy, polytetrafluoroethylene) filled with glass which could be used to improve dimensional stability. I/O plate 600, fluidics plate 602, and seal plate 604 also could be manufactured by machining or injection molding. Other methods of bonding the layers together may include chemical adhesives, plasma etching, combinations of etching and adhesives, and laser bonding. Membrane 304 may also be bonded to seal plate 604 using similar technologies. A rubber or silicone membrane in combination with a fluidics stack assembly 302 formed of acrylic could also be contemplated for a lower pressure, lower cost biocompatible unit. The fluidics stack assembly 302 and/or membrane 304 combination may be provided as a single-use disposable cartridge for cross contamination-sensitive applications such as purification of proteins for therapeutic use.

I/O plate 600 may include a plurality of column port holes 612, a plurality of inlet port holes 614, and a plurality of outlet port holes 614. The plurality of column port holes 612, the plurality of inlet port holes 614, and the plurality of outlet port holes 616 extend through a front face 618 of I/O plate 600 and exit a back face of I/O plate 600. In an exemplary embodiment, the plurality of column port holes 612, the plurality of inlet port holes 614, and the plurality of outlet port holes 616 have a diameter of 0.031 inches. In the exemplary embodiment of FIG. 5, I/O plate 600 includes eight column port holes 612 to correspond with the eight column port bores 500, four inlet port holes 614 to correspond with the four inlet port bores 502, and four outlet port holes 614 to correspond with the four outlet port bores 504 though any number of holes may be used depending on the application. The eight column port holes 612 align with the eight column port bores 500, the four inlet port holes 614 align with the four inlet port bores 502, and the four outlet port holes 614 align with the four outlet port bores 504 when I/O plate 600 is mounted to port plate 202.

Figure 7:
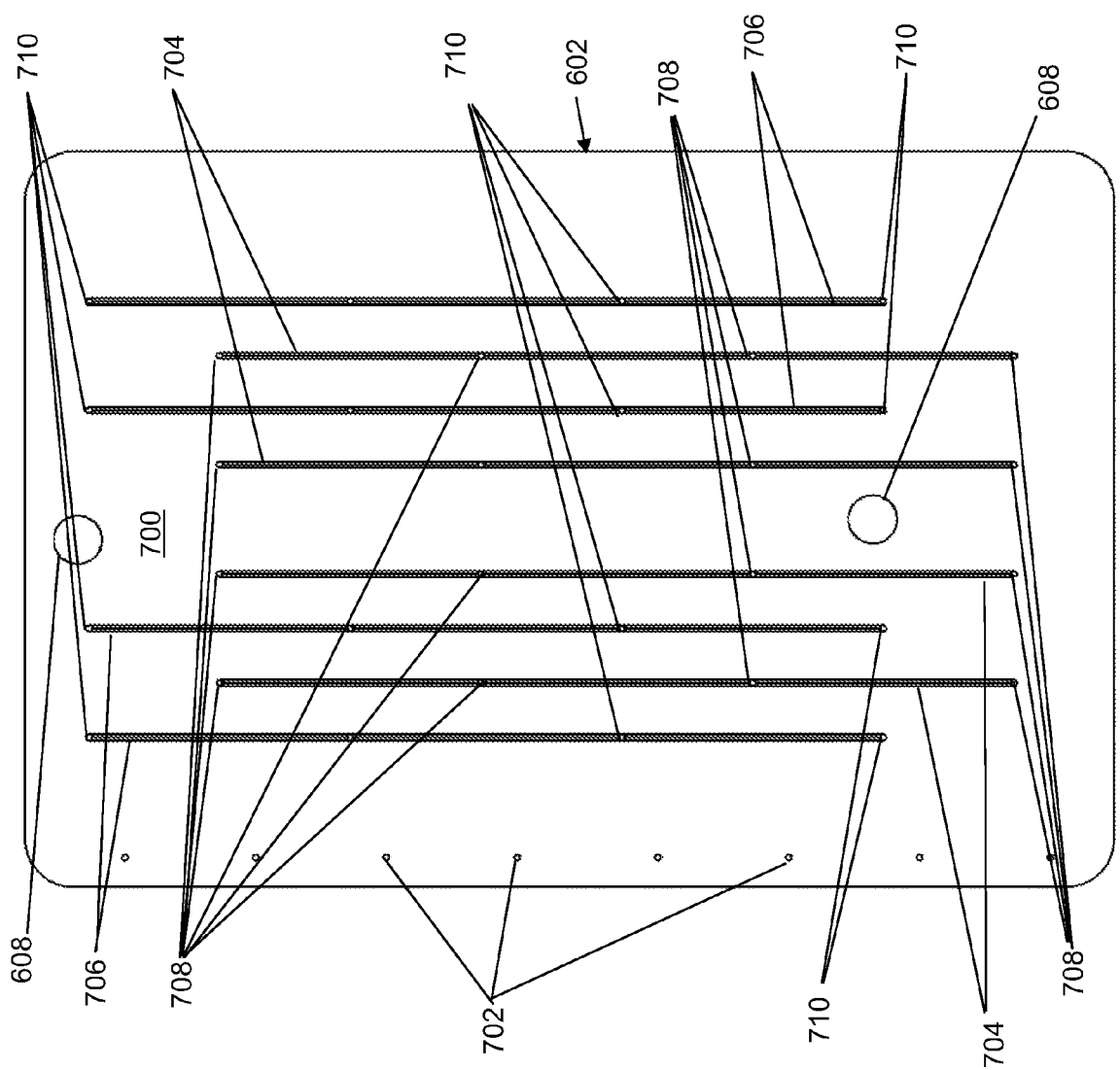
FIG. 7 shows a front face of a fluidics plate of the fluidics stack assembly of FIG. 6 in accordance with an exemplary embodiment.

With reference to FIG. 7, a front face 700 of fluidics plate 602 is shown in accordance with an exemplary embodiment. In the exemplary embodiment of FIG. 7, fluidics plate 602 includes a second plurality of column port holes 702, a plurality of inlet port channels 704, and a plurality of outlet port channels 706. The second plurality of column port holes 702 extend through front face 700 of fluidics plate 602 and exit a back face 800 (shown with reference to FIG. 8) of fluidics plate 602. The second plurality of column port holes 702 align with the plurality of column port holes 612 of I/O plate 600 when I/O plate 600 is bonded with or mounted to fluidics plate 602 using dowel pins 314. The plurality of inlet port channels 704 align with the plurality of inlet port holes 614 of I/O plate 600 when I/O plate 600 is bonded with or mounted to fluidics plate 602 using dowel pins 314. The plurality of outlet port channels 706 align with the plurality of outlet port holes 616 of I/O plate 600 when I/O plate 600 is bonded with or mounted to fluidics plate 602 using dowel pins 314.

A plurality of inlet holes 708 within each of the plurality of inlet port channels 704 extend through front face 700 of fluidics plate 602 and exit back face 800 of fluidics plate 602. A plurality of outlet holes 710 within each of the plurality of outlet port channels 706 extend through front face 700 of fluidics plate 602 and exit back face 800 of fluidics plate 602. In an exemplary embodiment, the second plurality of column port holes 702, the plurality of inlet holes 708, and the plurality of outlet holes 710 have a diameter of 0.031 inches. In an exemplary embodiment, the plurality of inlet port channels 704 and the plurality of outlet port channels 706 have a width of 0.031 inches and a depth of 0.031 inches with a rounded bottom. In the exemplary embodiment of FIG. 7, fluidics plate 602 includes eight column port holes 702 to correspond with the eight column port holes 612 of I/O plate 600, four inlet port channels 704 and four inlet holes 708 within each inlet port channel to correspond with the four inlet port holes 614, and four outlet port channels 706 and four outlet holes 710 within each inlet port channel to correspond with the four outlet port holes 616 though any number of holes may be used depending on the application.

Figure 8:
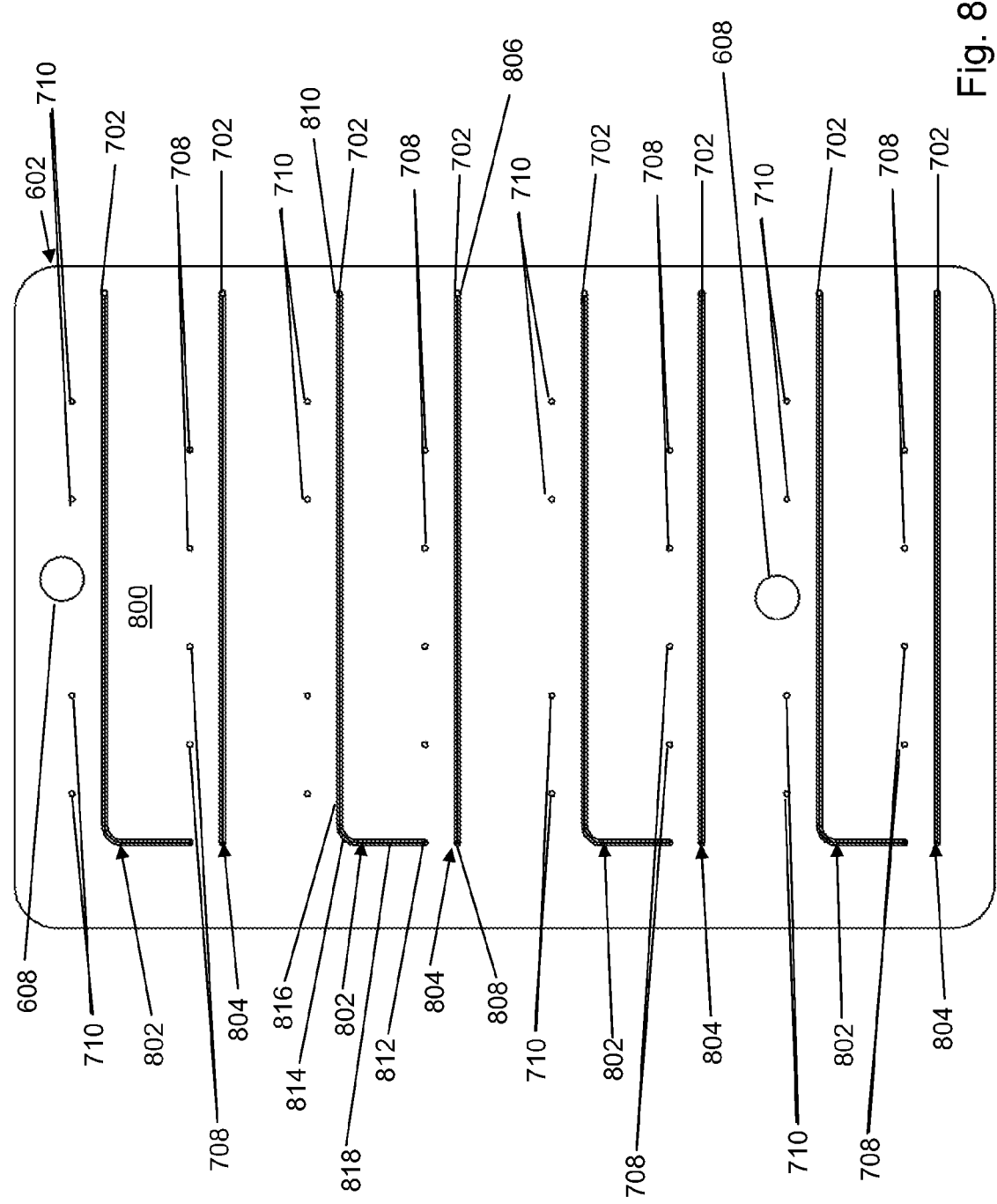
FIG. 8 shows a back face of the fluidics plate of FIG. 7 in accordance with an exemplary embodiment.

With reference to FIG. 8, a back face 800 of fluidics plate 602 is shown in accordance with an exemplary embodiment. In the exemplary embodiment of FIG. 8, fluidics plate 602 includes a first plurality of channels 802 and a second plurality of channels 804. The first plurality of channels 802 each have an L-shape that extends between a first end 810 and a second end 812. A corner channel 814 connects a first leg channel 816 and a second leg channel 818 of the first plurality of channels 802 forming a generally ninety degree angle though this is not required. A first subset of the second plurality of column port holes 702 extend through fluidics plate 602 at first end 810 of each of the first plurality of channels 802. The second plurality of channels 804 each have a linear shape that extends between a first end 806 and a second end 808. A second subset of the second plurality of column port holes 702 extend through fluidics plate 602 at first end 806 of each of the second plurality of channels 804. The plurality of inlet holes 708 and the plurality of outlet holes 710 form rows of holes in columns that are offset from each other to align with the plurality of inlet port channels 704 and the plurality of outlet port channels 706 on front face 800, respectively. First leg channel 816 of the first plurality of channels 802 and the second plurality of channels 804 are generally parallel to each other and to the rows formed by the plurality of inlet holes 708 and the plurality of outlet holes 710. Second end 812 of the first plurality of channels 802 extends to a point in line with each row formed by the plurality of inlet holes 708.

In an exemplary embodiment, the rows formed by the plurality of inlet holes 708 and the rows formed by the plurality of outlet holes 710 are separated by approximately 0.68 inches. In an exemplary embodiment, the rows formed by the plurality of inlet holes 708 are separated from the second plurality of channels 804 by approximately 0.187 inches, and the rows formed by the plurality of outlet holes 710 are separated from the first leg channel 816 of the first plurality of channels 802 by approximately 0.187 inches. In an exemplary embodiment, the first plurality of channels 802 and the second plurality of channels 804 have a width of approximately 0.031 inches and a depth of approximately 0.031 inches with a rounded bottom. In the exemplary embodiment of FIG. 8, fluidics plate 602 includes four channels 802 and four channels 804 to correspond with the eight column port holes 702 though any number of channels may be used depending on the application.

Figure 9:
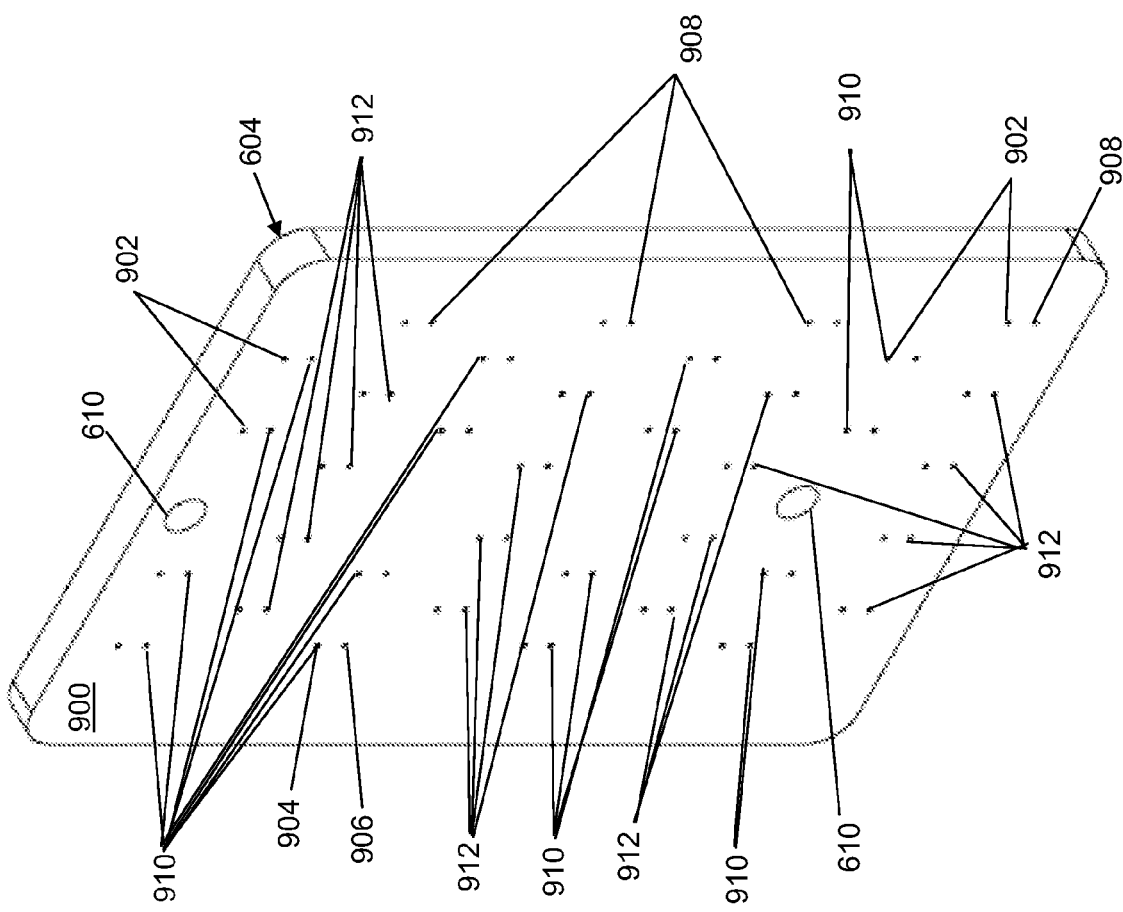
FIG. 9 shows a front, perspective view of a seal plate of the fluidics stack assembly of FIG. 6 in accordance with an exemplary embodiment.

With reference to FIG. 9, a front face 900 of seal plate 604 is shown in accordance with an exemplary embodiment. In the exemplary embodiment of FIG. 9, seal plate 604 includes a plurality of pairs of holes 902 that are arranged in rows and columns. The plurality of pairs of holes 902 extend through front face 900 of seal plate 604 and exit a back face of seal plate 604. Each pair of the plurality of pairs of holes 902 includes a first hole 904 positioned above a second hole 906 with first hole 904 separated from second hole 906 by approximately 0.187 inches. Each pair of the plurality of pairs of holes 902 is arranged parallel to the other pairs of the plurality of pairs of holes 902. The plurality of pairs of holes 902 are arranged in rows and columns to align with elements of back face 800 of fluidics plate 602. In a first subset of holes 908 of the plurality of pairs of holes 902, first hole 904 aligns with second end 812 of the first plurality of channels 802 and second hole 906 aligns with second end 808 of the second plurality of channels 804. In a second subset of holes 910 of the plurality of pairs of holes 902, first hole 904 aligns with the plurality of outlet holes 710 and second hole 906 aligns with first leg channel 816 of the first plurality of channels 802. In a third subset of holes 912 of the plurality of pairs of holes 902, first hole 904 aligns with the plurality of inlet holes 708 and second hole 906 aligns with the second plurality of channels 804. In an exemplary embodiment, the plurality of pairs of holes 902 have a diameter of approximately 0.031 inches.

Figure 10:
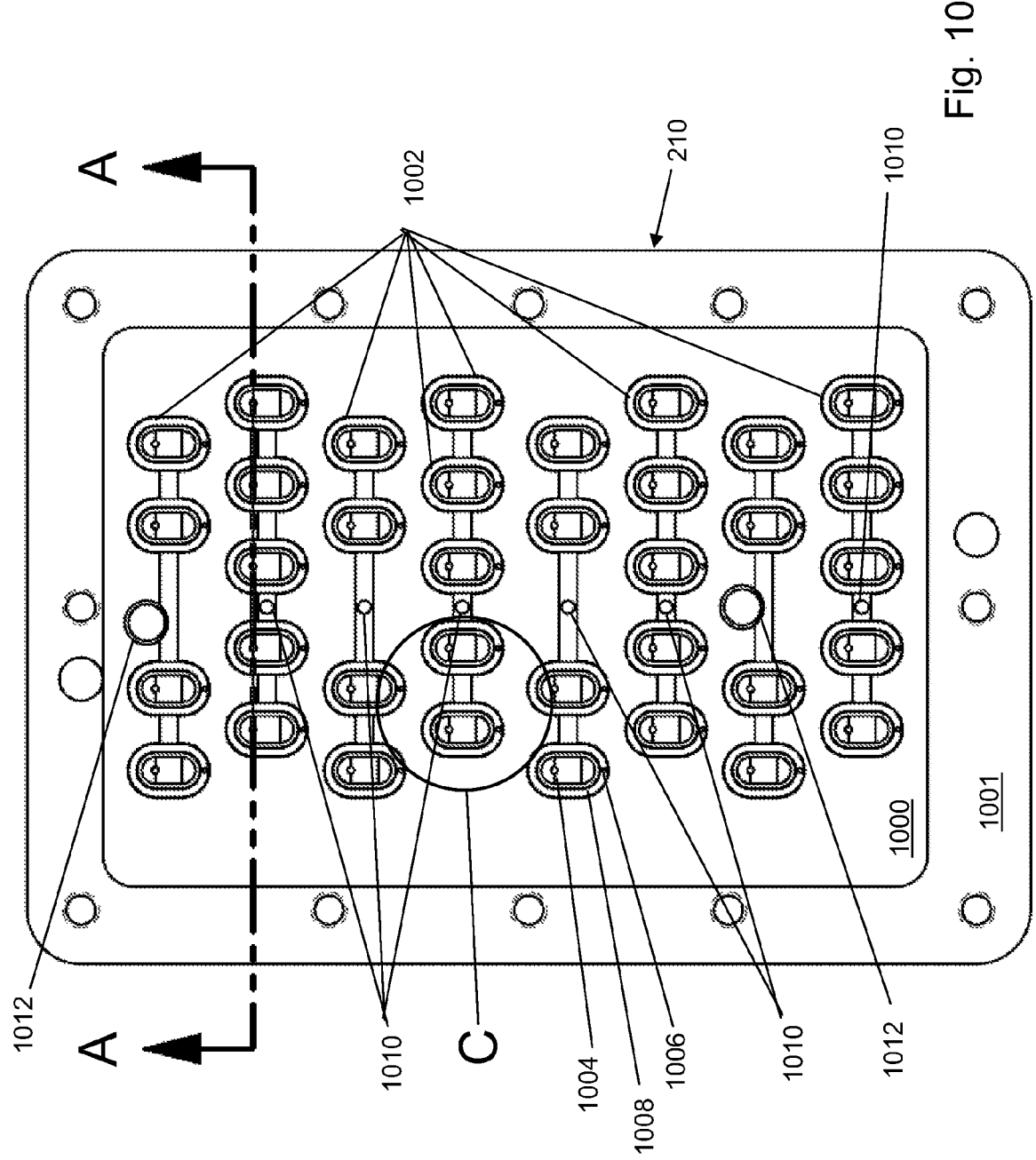
FIG. 10 shows a front view of a pressure cup plate of the right valve block assembly of FIG. 3 in accordance with an exemplary embodiment.

With reference to FIG. 10, recessed face 1000 and front face 1001 of pressure cup plate 210 are shown in accordance with an exemplary embodiment. In an exemplary embodiment, pressure cup plate 210 may be formed of stainless steel. In the exemplary embodiment of FIG. 10, recessed face 1000 of pressure cup plate 210 includes a plurality of pressure cups 1002 that align with the plurality of pairs of holes 902 that extend through the back face of seal plate 604. Each pressure cup of the plurality of pressure cups 1002 is centered inline with a center of a pair of holes of the plurality of pairs of holes 902 when pressure cup plate 210 is aligned with seal plate 604. Membrane 304 is positioned between the back face of seal plate 604 and recessed face 1000 of pressure cup plate 210. Each pressure cup of the plurality of pressure cups 1002 includes a recess 1300 (shown with reference to FIG. 13), a first pressure port 1004, a second pressure port 1006, and an o-ring channel 1008. In the exemplary embodiment of FIG. 10, pressure cup plate 210 further includes dowel bores 1012 and a plurality of vent holes 1010 that extend through recessed face 1000 and back face 1100 (shown with reference to FIG. 11). Dowel pins 314 mount in dowel bores 1012.

Figure 11:
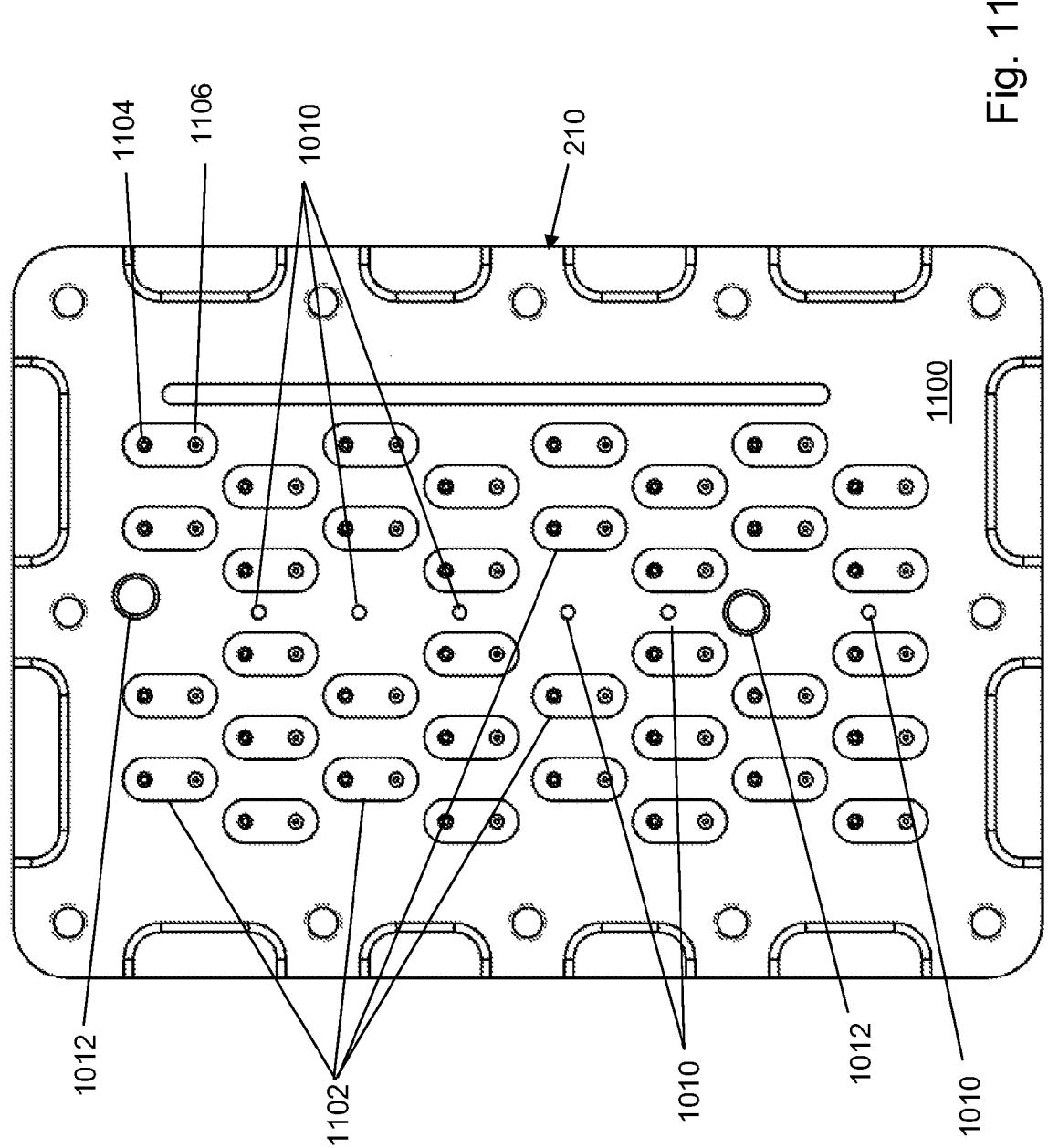
FIG. 11 shows a back view of the pressure cup plate of FIG. 10 in accordance with an exemplary embodiment.

With reference to FIG. 11, a back face 1100 of pressure cup plate 210 is shown in accordance with an exemplary embodiment. In the exemplary embodiment of FIG. 11, back face 1100 of pressure cup plate 210 includes a plurality of pairs of pressure ports 1102 that correspond with first pressure port 1004 and second pressure port 1006 of each of the plurality of pressure cups 1002. Each pair of pressure ports of the plurality of pairs of pressure ports 1102 includes a third pressure port 1104 that connects with first pressure port 1004 through a channel internal to pressure cup plate 210 and a fourth pressure port 1106 that connects with second pressure port 1006 through a channel internal to pressure cup plate 210.

Figure 12:
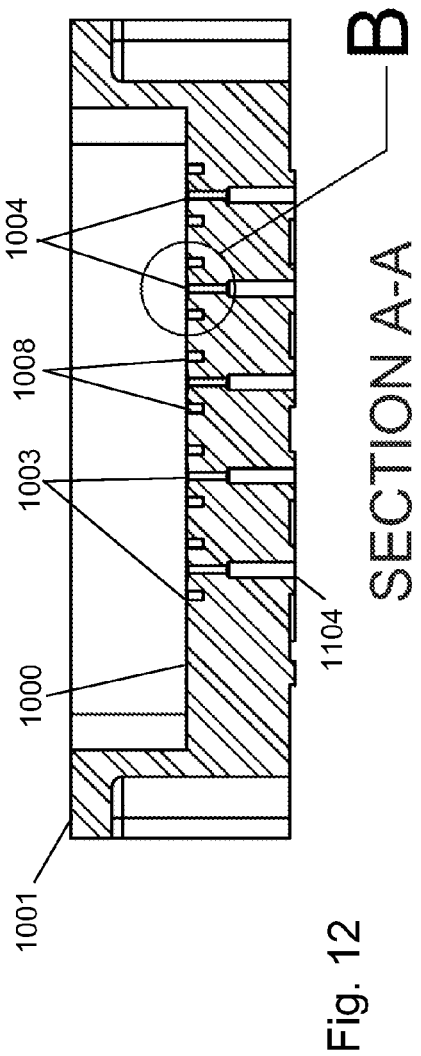
FIG. 12 shows a cross sectional view of the pressure cup plate of FIG. 10 in accordance with an exemplary embodiment.
Figure 13:
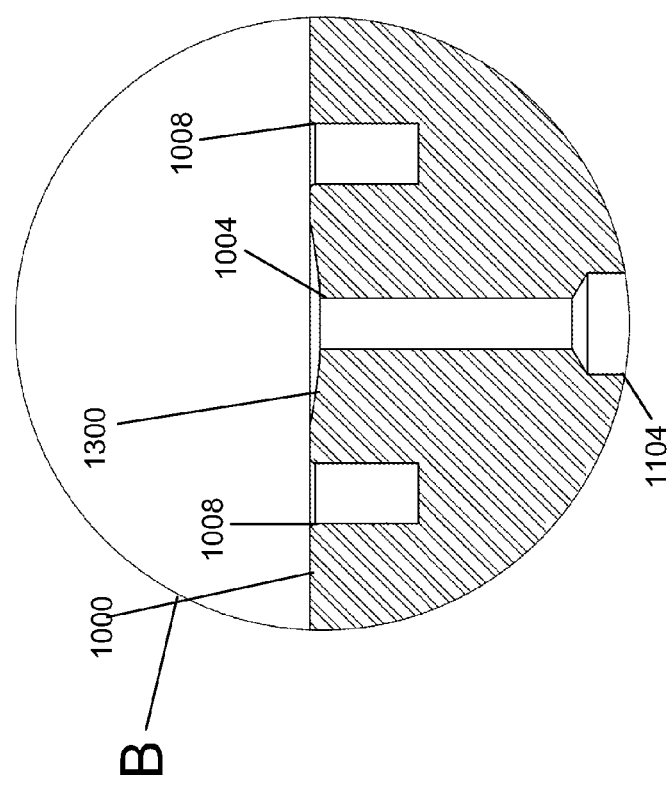
FIG. 13 shows a blowup cross sectional view of a portion of the pressure cup plate of FIG. 12 in accordance with an exemplary embodiment.

With reference to FIG. 12, a cross section A-A (indicated in FIG. 10) of pressure cup plate 210 is shown in accordance with an exemplary embodiment. With reference to FIG. 13, a blowup of a section B (indicated in FIG. 12) of the cross section A-A of pressure cup plate 210 is shown in accordance with an exemplary embodiment. In an exemplary embodiment, recess 1300 has a maximum depth of approximately 0.01 inches and a width in the plane of cross section A-A of 0.186 inches. In an exemplary embodiment, o-ring channel 1008 has a depth of approximately 0.1 inches and a width of approximately 0.056 inches in the plane of cross section A-A.

Figure 14:
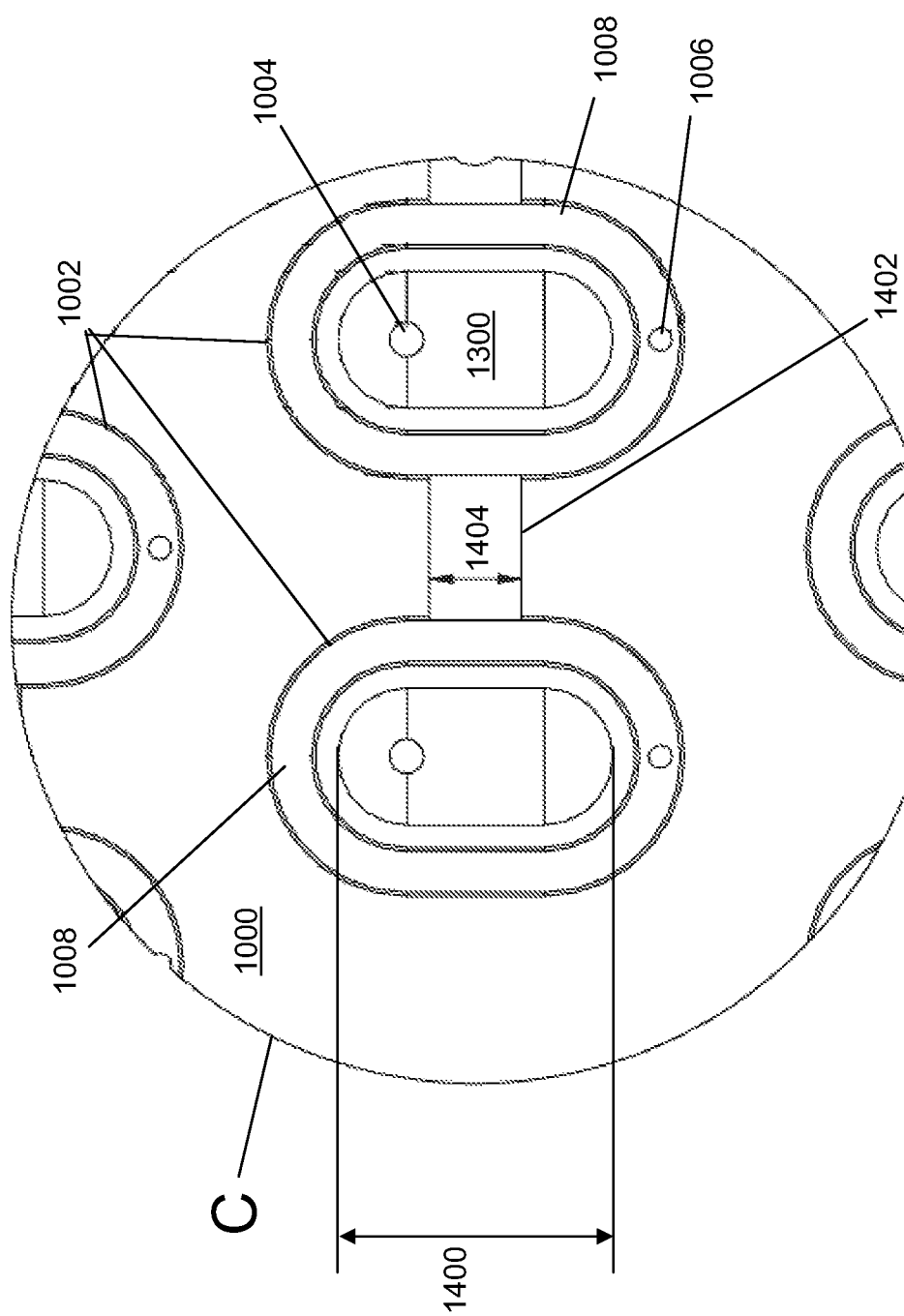
FIG. 14 shows a blowup view of a portion of a front face of the pressure cup plate of FIG. 10 in accordance with an exemplary embodiment.

With reference to FIG. 14, a blowup of a section C (indicated in FIG. 10) of pressure cup plate 210 is shown in accordance with an exemplary embodiment. Second pressure port 1006 is positioned in o-ring channel 1008. In an exemplary embodiment, recess 1300 has a length 1400 of 0.374 inches. A vent channel 1402 extends between the plurality of pressure cups 1002 arranged in a row. Vent channel 1402 has a width of approximately 0.125 inches and a depth of 0.005 inches.

Figure 15:
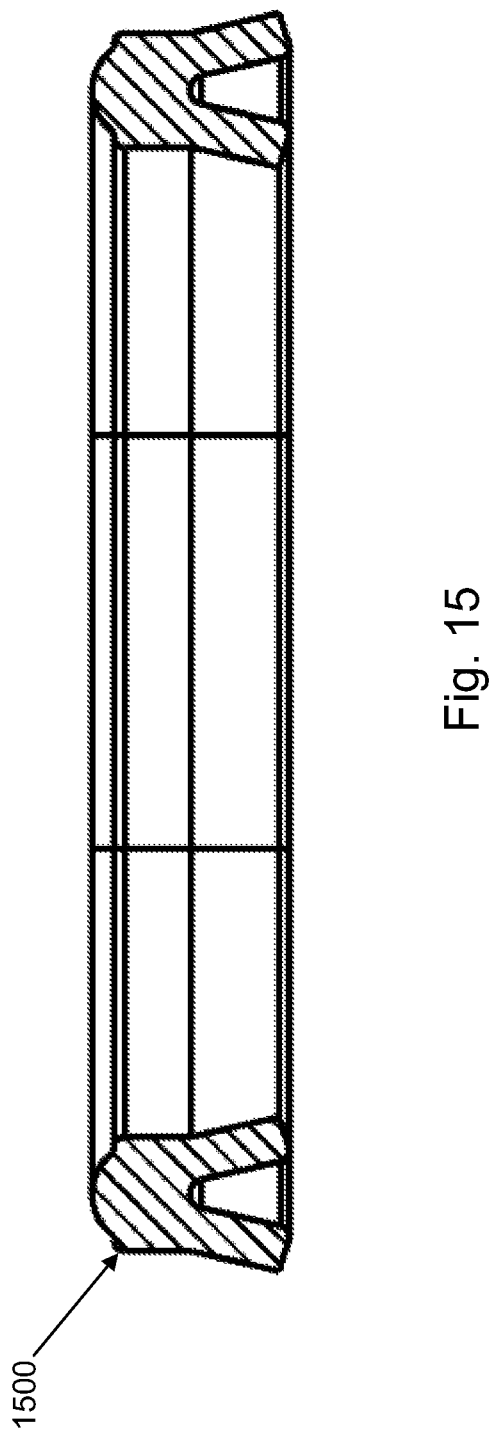
FIG. 15 shows a side, cutaway view of an o-ring used in the pressure cup plate of FIG. 10 in accordance with an exemplary embodiment.
Figure 16:
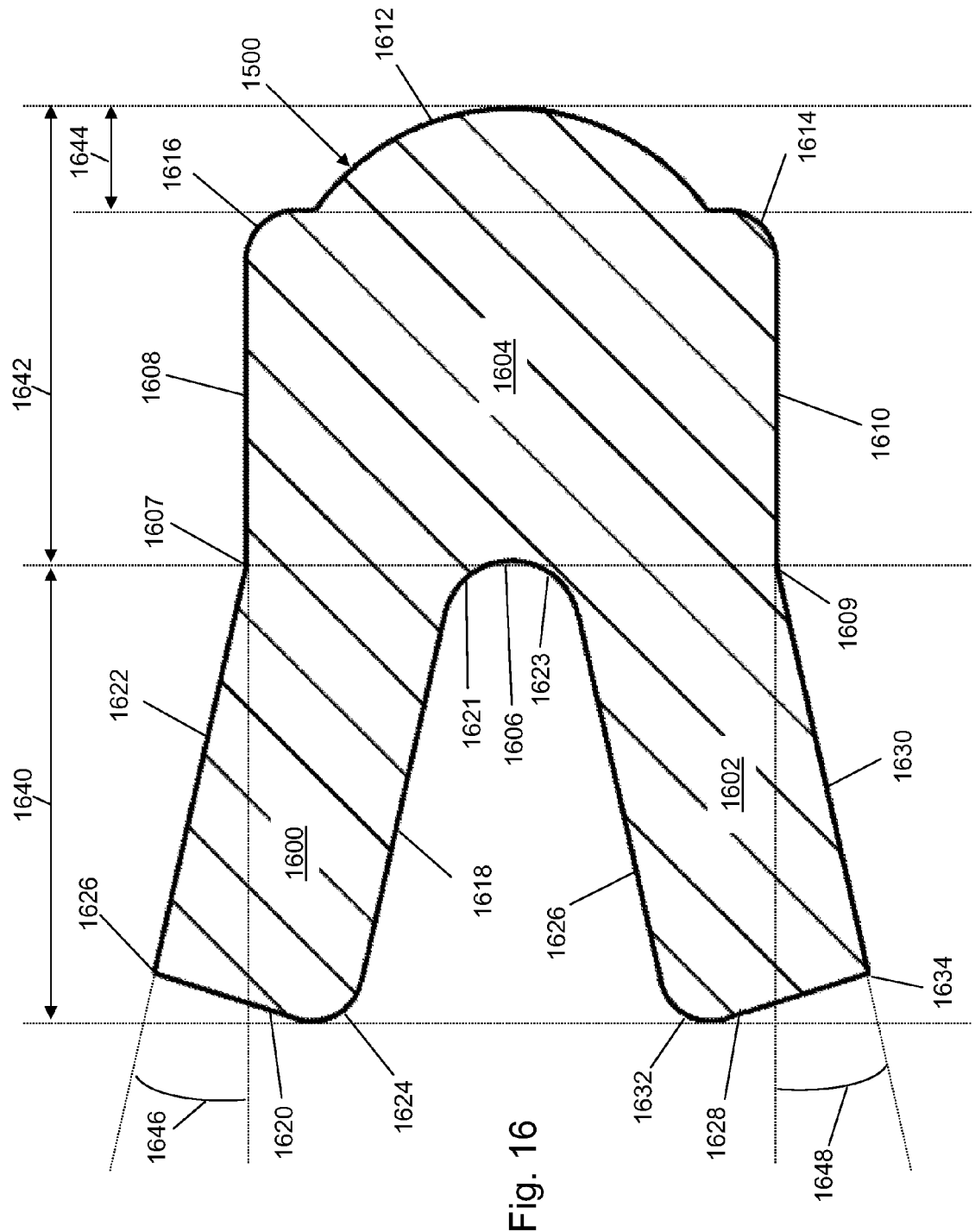
FIG. 16 shows a blowup cross sectional view of the o-ring of FIG. 15 in accordance with an exemplary embodiment.

With reference to FIG. 15, a side, cutaway view of an o-ring 1500 of the plurality of o-rings 306 is shown in accordance with an exemplary embodiment. With reference to FIG. 16, a cross section of o-ring 1500 of the plurality of o-rings 306 is shown in accordance with an exemplary embodiment. Pneumatic pressure applied through second pressure port 1006 holds o-ring 1500 of the plurality of o-rings 306 in place with an approximately constant pressure. The o-ring 1500 is stably deformed into the channel and against membrane 304 as a result of gas pressure through second pressure port 1006, effectively sealing the perimeter of the pressure cup 1002 to prevent both gas leaks on the pneumatic side and fluid leaks between seal plate 604 and membrane 304 during operation of SMB system 100. Thus, a seal exists on the gas side of membrane 304 that is subjected to gas pressure provided by the first pressure system. The high pressure gas "activates" the seal by causing o-ring 1500 to flare against the side walls of o-ring channel 1008 and to push against membrane 304 isolating the fluid port pressure from the gas port pressure. The pneumatic pressure on o-ring 1500 may be constant and independent from the pneumatic pressure on membrane 304 provided by the second pressure system.

When the pneumatic pressure on membrane 304 exceeds the fluid back pressure, membrane 304 is forced against the plurality of pairs of holes 902 of seal plate 604, which are surrounded by o-ring 1500 on the opposite side of membrane 304, preventing fluid flow between them. When the fluid back pressure exceeds the pneumatic pressure on membrane 304, membrane 304 deflects into recess 1300 and fluid flow is allowed between the plurality of holes, but prevented from flowing outside of the area surrounded by o-ring 1500 By allowing fluid flow between the plurality of pairs of holes 902 of seal plate 604, fluid flow can be provided between the plurality of outlet holes 710 and the first plurality of channels 802, between the plurality of inlet holes 708 and the second plurality of channels 804, between the first plurality of channels 802 and the second plurality of channels 804, through the second plurality of column port holes 702 of fluidics plate 602, between the plurality of inlet port holes 614 and the plurality of inlet port channels 704, between the plurality of outlet port holes 614 and the plurality of outlet port channels 706, and through the plurality of column port holes 612 of I/O plate 600. Thus, by controlling the deflection of membrane 304 at each pressure cup of the plurality of pressure cups 1002, fluid flow between the second plurality of column port connectors 204, the plurality of inlet port connectors 206, and the plurality of outlet port connectors 208.

In an exemplary embodiment, o-ring 1500 is formed of an elastic material such as rubber or soft plastic having a hardness of 80 Shore measured using a Shore A Durometer. Other materials having the same or different hardness values may be used. For example, o-ring 1500 may be formed of a Buna N or Nitrile material that is a copolymer of butadiene and acrylonitrile. As another example, a chemically resistant fluoroelastomer material such as Perlast or polytetrafluoroethene may be used to form o-ring 1500. In an exemplary embodiment, o-ring 1500 has a generally oval shape to correspond with o-ring channel 1008 and having a width of approximately 0.502 inches, a length of approximately 0.314 inches, and a depth of approximately 0.091 inches. The cross section of o-ring 1500 has a generally U-shape with a first leg 1600, a second leg 1602, and a body 1604 formed as a unitary piece, for example, using a molding process. First leg 1600 and second leg 1602 are pressed into o-ring channel 1008 so that cup 1606 faces down into o-ring channel 1008. First leg 1600 and second leg 1602 extend from first surface 1606 of body 1604 forming a cup. In the exemplary embodiment of FIG. 16, the cup has a rounded bottom surface.

Body 1604 includes a first surface 1606, a second surface 1608, a third surface 1610, and a fourth surface 1612. Second surface 1608 extends from first surface 1606 at a first edge 1607. Third surface 1610 extends from an opposite end of first surface 1606 at a second edge 1609. Fourth surface 1612 extends from third surface 1610 at a third edge 1614. Fourth surface 1612 extends from second surface 1608 at a fourth edge 1616. In the exemplary embodiment of FIG. 16, third edge 1614 and fourth edge 1616 are rounded and fourth surface 1612 protrudes away from body 1604 relative to third edge 1614 and fourth edge 1616 by a first height 1644. In an exemplary embodiment, first height 1644 is approximately 0.01 inches. In an exemplary embodiment, body 1604 has a second height 1642 between first surface 1606 and an edge of fourth surface 1612 of approximately 0.045 inches.

First leg 1600 includes a first leg interior surface 1618, a first leg bottom surface 1620, and a first leg exterior surface 1622. First leg interior surface 1618 extends from first surface 1606 at a fifth edge 1621. First leg bottom surface 1620 extends from first leg interior surface 1618 at a sixth edge 1624. First leg exterior surface 1622 extends from first leg bottom surface 1620 at a seventh edge 1626 to first edge 1607. In the exemplary embodiment of FIG. 16, first leg exterior surface 1622 extends from first edge 1607 forming an angle 1646 relative to second surface 1608. In an exemplary embodiment, angle 1646 is approximately five degrees. Thus, the angle formed between first leg exterior surface 1622 and second surface 1608 is approximately 175 degrees. In the exemplary embodiment of FIG. 16, fifth edge 1621 and sixth edge 1624 are rounded and seventh edge 1626 forms an approximately right angle. First leg 1600 extends from body 1604 by a third height 1640 and has width between first leg interior surface 1618 and first leg exterior surface 1622 of approximately 0.02 inches. In an exemplary embodiment, third height 1640 is approximately 0.046 inches. In an exemplary embodiment, third height 1640 is greater than second height 1642. First leg interior surface 1618 and first leg exterior surface 1622 are generally parallel to each other. First leg bottom surface 1620 is generally perpendicular to first leg exterior surface 1622.

Second leg 1602 includes a second leg interior surface 1626, a second leg bottom surface 1628, and a second leg exterior surface 1630. Second leg interior surface 1626 extends from first surface 1606 at an eighth edge 1623. Second leg bottom surface 1628 extends from second leg interior surface 1626 at a ninth edge 1632. Second leg exterior surface 1630 extends from second leg bottom surface 1628 at a tenth edge 1634 to second edge 1609. In the exemplary embodiment of FIG. 16, second leg exterior surface 1630 extends from second edge 1609 forming a second angle 1648 relative to third surface 1610. In an exemplary embodiment, second angle 1648 is approximately five degrees. Thus, the angle formed between second leg exterior surface 1630 and third surface 1610 is approximately 175 degrees. In the exemplary embodiment of FIG. 16, eighth edge 1623 and ninth edge 1632 are rounded and tenth edge 1634 forms an approximately right angle. Second leg 1602 extends from body 1604 by third height 1640 and has a width between second leg interior surface 1626 and second leg exterior surface 1630 of approximately 0.02 inches.

Figure 17:
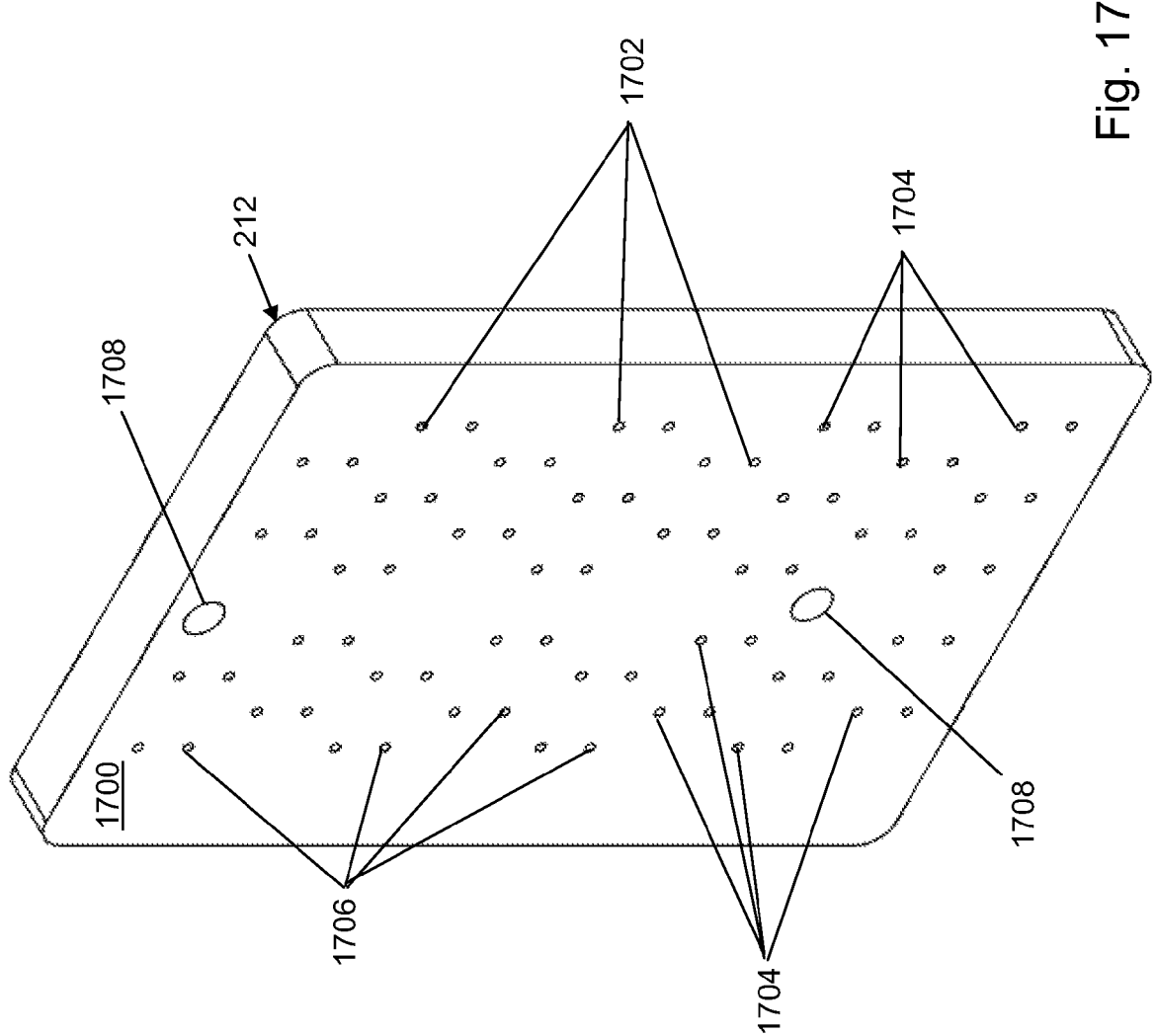
FIG. 17 shows a front, perspective view of a thermal isolation plate of the right valve block assembly of FIG. 3 in accordance with an exemplary embodiment.

With reference to FIG. 17, a front face 1700 of thermal isolation plate 212 is shown in accordance with an exemplary embodiment. In an exemplary embodiment, thermal isolation plate 212 is formed of a thermoplastic material that provides a thermal barrier between pressure cup plate 210 and valve manifold 214. In the exemplary embodiment of FIG. 9, thermal isolation plate 212 includes a second plurality of pairs of holes 1702 that are arranged to align with the plurality of pairs of pressure ports 1102 of pressure cup plate 210. The second plurality of pairs of holes 1702 extend through front face 1700 of thermal isolation plate and exit a back face of thermal isolation plate 212. First gasket plate 308 and second gasket plate 310 have a similar arrangement of holes when aligned with thermal isolation plate 212. In an exemplary embodiment, first gasket plate 308 and second gasket plate 310 are formed of an aramid-fiber-nitrile material that provides sealing of thermal isolation plate 212. Each pair of the second plurality of pairs of holes 1702 includes a first hole 1704 positioned above a second hole 1706 with first hole 1704 separated from second hole 1706 by approximately 0.344 inches. Each pair of the second plurality of pairs of holes 1702 is arranged parallel to the other pairs of the second plurality of pairs of holes 1702. In an exemplary embodiment, the second plurality of pairs of holes 1702 have a diameter of approximately 0.063 inches. In the exemplary embodiment of FIG. 17, thermal isolation plate 212 further includes dowel bores 1708 that extend through front face 1700 and the back face of thermal isolation plate 212. Dowel pins 314 mount in dowel bores 1708.

Figure 18:
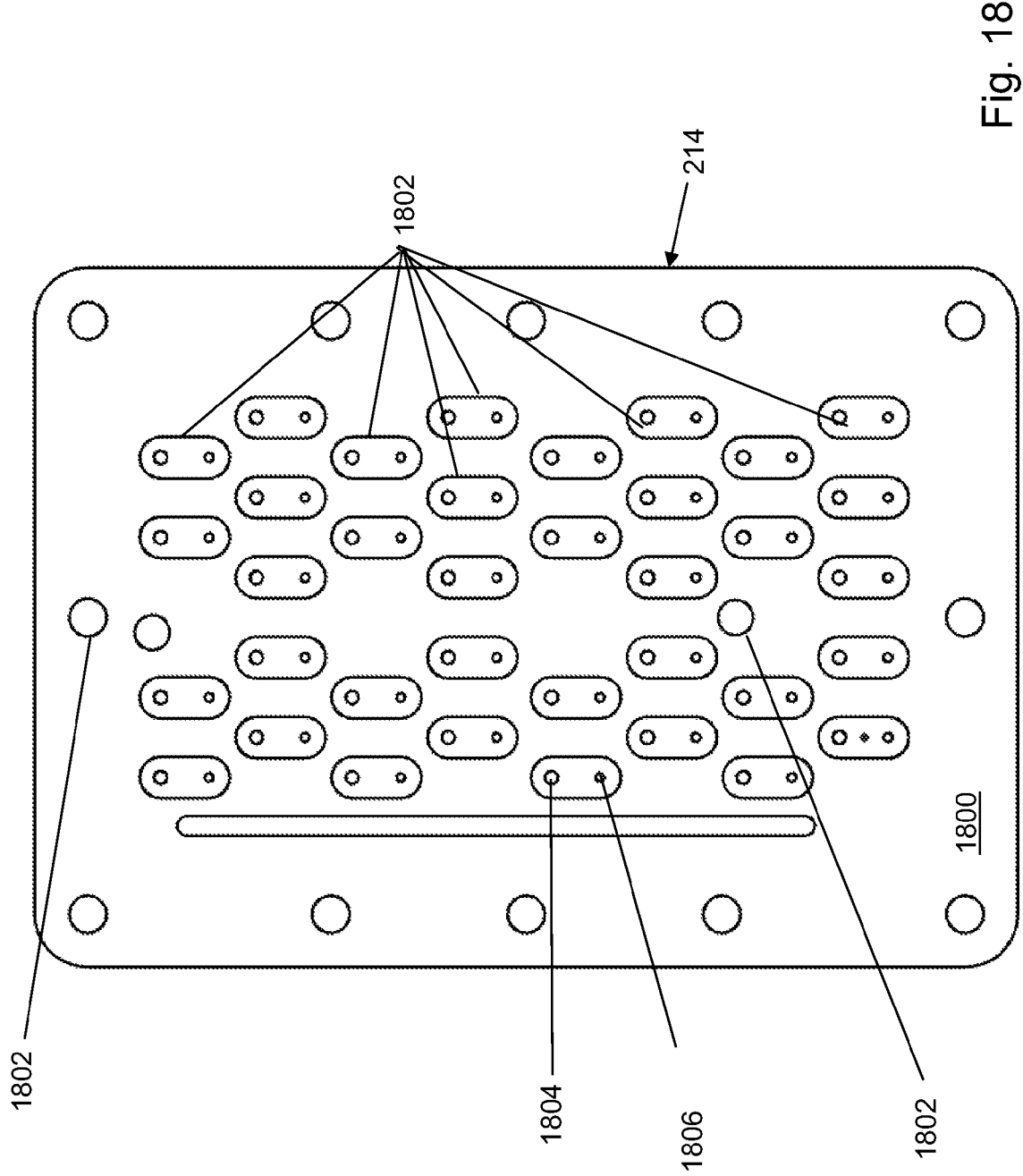
FIG. 18 shows a front view of a valve manifold of the right valve block assembly of FIG. 3 in accordance with an exemplary embodiment.

With reference to FIG. 18, a front face 1800 of valve manifold 214 is shown in accordance with an exemplary embodiment. In an exemplary embodiment, valve manifold 214 is formed of aluminum. In the exemplary embodiment of FIG. 18, front face 1800 of valve manifold 214 includes a second plurality of pairs of pressure ports 1802 that correspond with the plurality of pairs of pressure ports 1102 of pressure cup plate 210. Each pair of pressure ports of the second plurality of pairs of pressure ports 1802 includes a fifth pressure port 1804 that aligns with first pressure port 1004 and third pressure port 1104 and a sixth pressure port 1806 that aligns with second pressure port 1006 and fourth pressure port 1106 thereby operably coupling the pressure ports.

Figure 19:
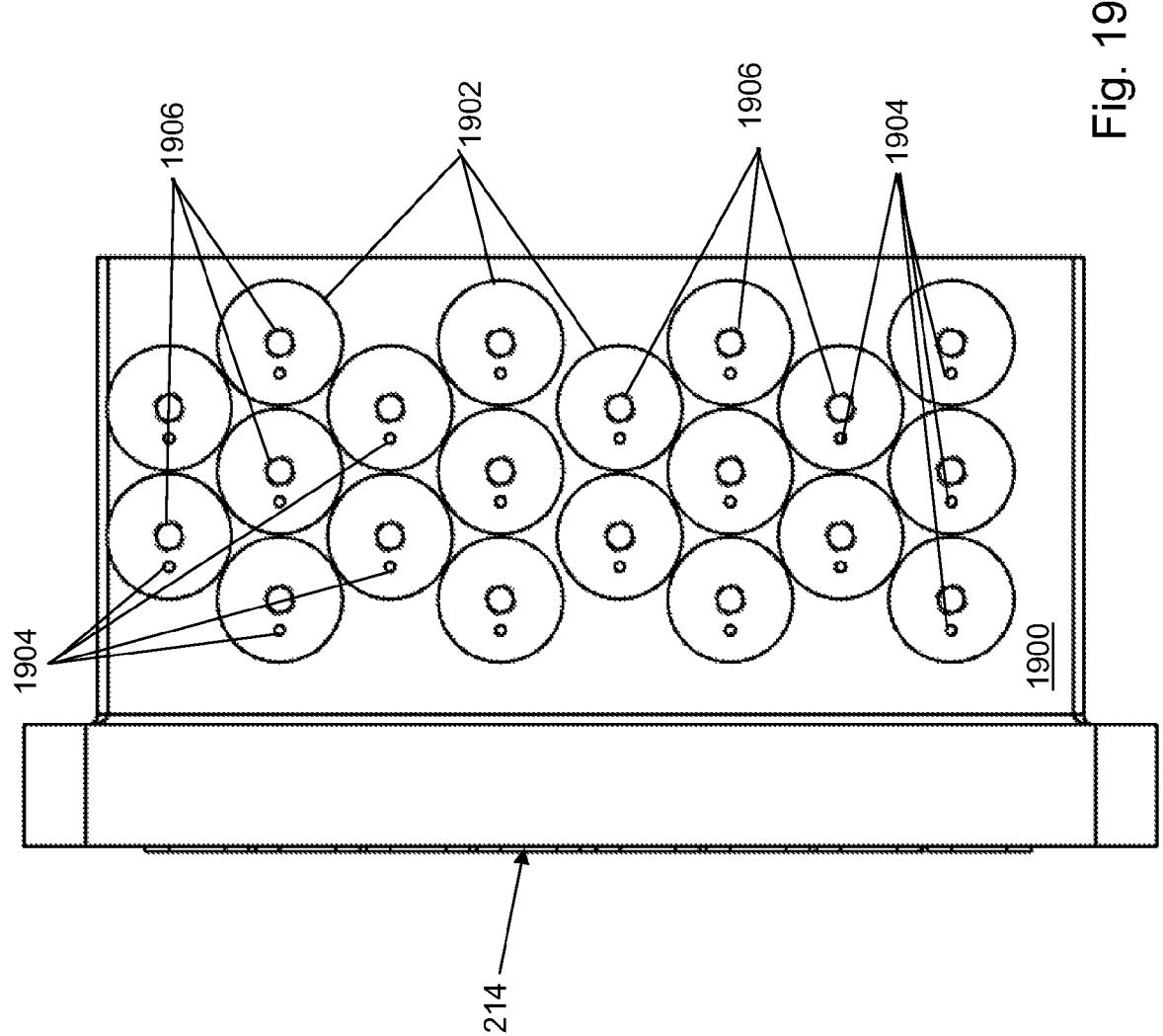
FIG. 19 shows a right side view of the valve manifold of FIG. 18 in accordance with an exemplary embodiment.

With reference to FIG. 19, right side face 1900 of valve manifold 214 is shown in accordance with an exemplary embodiment. In an exemplary embodiment, right side face 1900 of valve manifold 214 includes a plurality of valve connectors 1902 to which the first plurality of valves 216 are connected. Each valve connector of the plurality of valve connectors 1902 includes a first pressure port 1904 and a second pressure port 1906. First pressure port 1904 operably couples through channels within valve manifold 214 to a fifth pressure port 1804 of one of the second plurality of pairs of pressure ports 1802 to provide pneumatic pressure to first pressure port 1004 through third pressure port 1104 and fifth pressure port 1804. Second pressure port 1906 provides the exhaust port for the corresponding valve of the first plurality of valves 216. For example, when a valve opens the pressure is exhausted through second pressure port 1906 of the corresponding valve. In the exemplary embodiment of FIG. 19, right side face 1900 of valve manifold 214 includes 20 valve connectors 1902 though any number of valve connectors may be used depending on the application.

Figure 20:
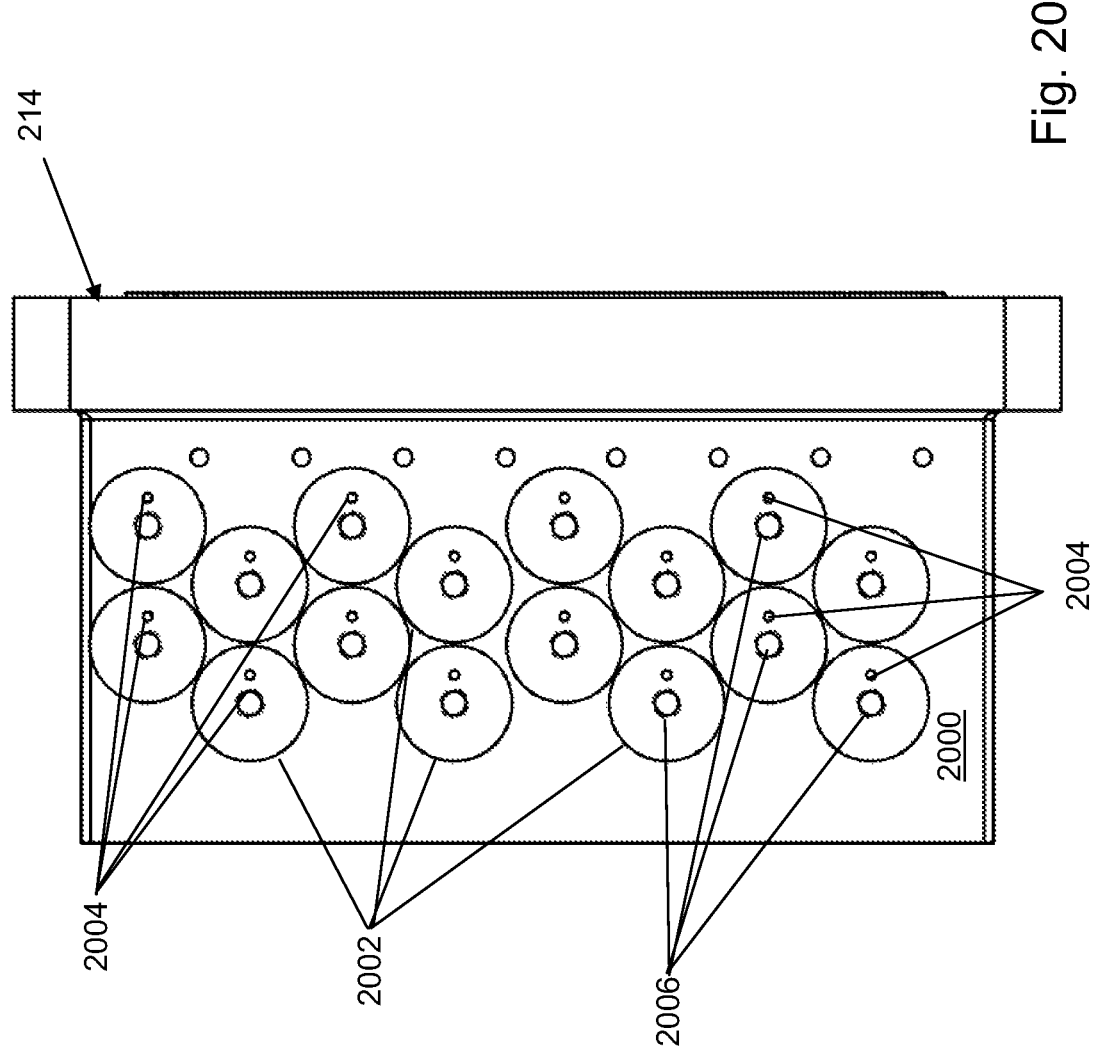
FIG. 20 shows a left side view of the valve manifold of FIG. 18 in accordance with an exemplary embodiment.

With reference to FIG. 20, left side face 2000 of valve manifold 214 is shown in accordance with an exemplary embodiment. In an exemplary embodiment, left side face 2000 of valve manifold 214 includes a plurality of valve connectors 2002 to which the second plurality of valves 217 are connected. Each valve connector of the plurality of valve connectors 2002 includes a third pressure port 2004 and a fourth pressure port 2006. Third pressure port 2004 operably couples through channels within valve manifold 214 to a fifth pressure port 1804 of one of the second plurality of pairs of pressure ports 1802 to provide pneumatic pressure to first pressure port 1004 through third pressure port 1104 and fifth pressure port 1804. Fourth pressure port 2006 provides the exhaust port for the corresponding valve of the second plurality of valves 217. For example, when a valve opens the pressure is exhausted through fourth pressure port 2006. In the exemplary embodiment of FIG. 20, left side face 2000 of valve manifold 214 includes 16 valve connectors 2002 though any number of valve connectors may be used depending on the application.

Figure 21:
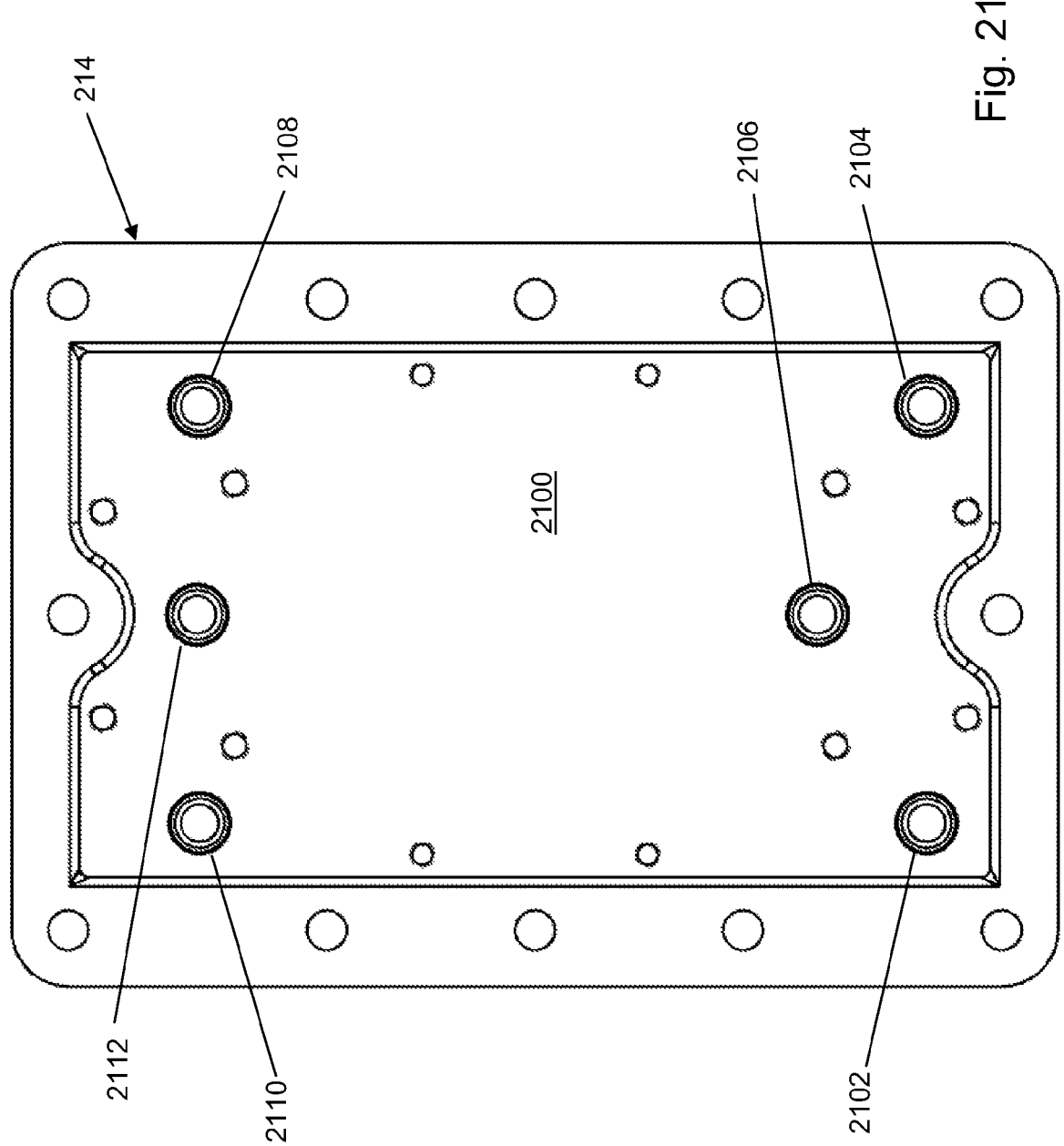
FIG. 21 shows a back side view of the valve manifold of FIG. 18 in accordance with an exemplary embodiment.

With reference to FIG. 21, a back side face 2100 of valve manifold 214 is shown in accordance with an exemplary embodiment. In an exemplary embodiment, back side face 2100 of valve manifold 214 includes a first pneumatic pressure connector 2102, a second pneumatic pressure connector 2104, and a third pneumatic pressure connector 2106. First pneumatic pressure connector 2102 and second pneumatic pressure connector 2104 are connected to the first plurality of valves 216 and the second plurality of valves 217. First pneumatic pressure connector 2102 and second pneumatic pressure connector 2104 provide pressure to the second pneumatic pressure system through fifth pressure port 1804 of each of the second plurality of pairs of pressure ports 1802. In an exemplary embodiment, first pneumatic pressure connector 2102 provides pressure to the first plurality of valves 216, and second pneumatic pressure connector 2104 provides pressure to the second plurality of valves 217. Third pneumatic pressure connector 2106 provides pressure to the first pneumatic pressure system through sixth pressure port 1806 of each of the second plurality of pairs of pressure ports 1802 that aligns with second pressure port 1006 and fourth pressure port 1106 to hold o-ring 1500 of the plurality of o-rings 306 in place. In an exemplary embodiment, the first pneumatic pressure system is not connected to any valves, but includes a separate system of internal channels in valve manifold 214 accessed by third pneumatic pressure connector 2106 from the rear of valve manifold 214.

Because the left valve block assembly and right valve block assembly 200 are equivalent, except that the left valve block assembly is rotated 180 degrees relative to the right valve block assembly 200, back side face 2100 of valve manifold 214 also includes a fourth pneumatic pressure connector 2108, a fifth pneumatic pressure connector 2110, and a sixth pneumatic pressure connector 2112. Fourth pneumatic pressure connector 2108 and a fifth pneumatic pressure connector 2110 are connected to a plurality of valves that correspond to the first plurality of valves 216 and the second plurality of valves 217 in the left block assembly. Sixth pneumatic pressure connector 2112 connects to the first pneumatic pressure system in the left block assembly. Thus, depending on whether the valve block assembly is mounted in the left or the right position relative to valve block panel 108, the bottom set of pneumatic pressure connectors is used. Thus, fourth pneumatic pressure connector 2108 and fifth pneumatic pressure connector 2110 provide pressure to the second pneumatic pressure system, and sixth pneumatic pressure connector 2112 provides pressure to the first pneumatic pressure system when right valve block assembly 200 is rotated and used as the left valve block assembly.

Figure 22:
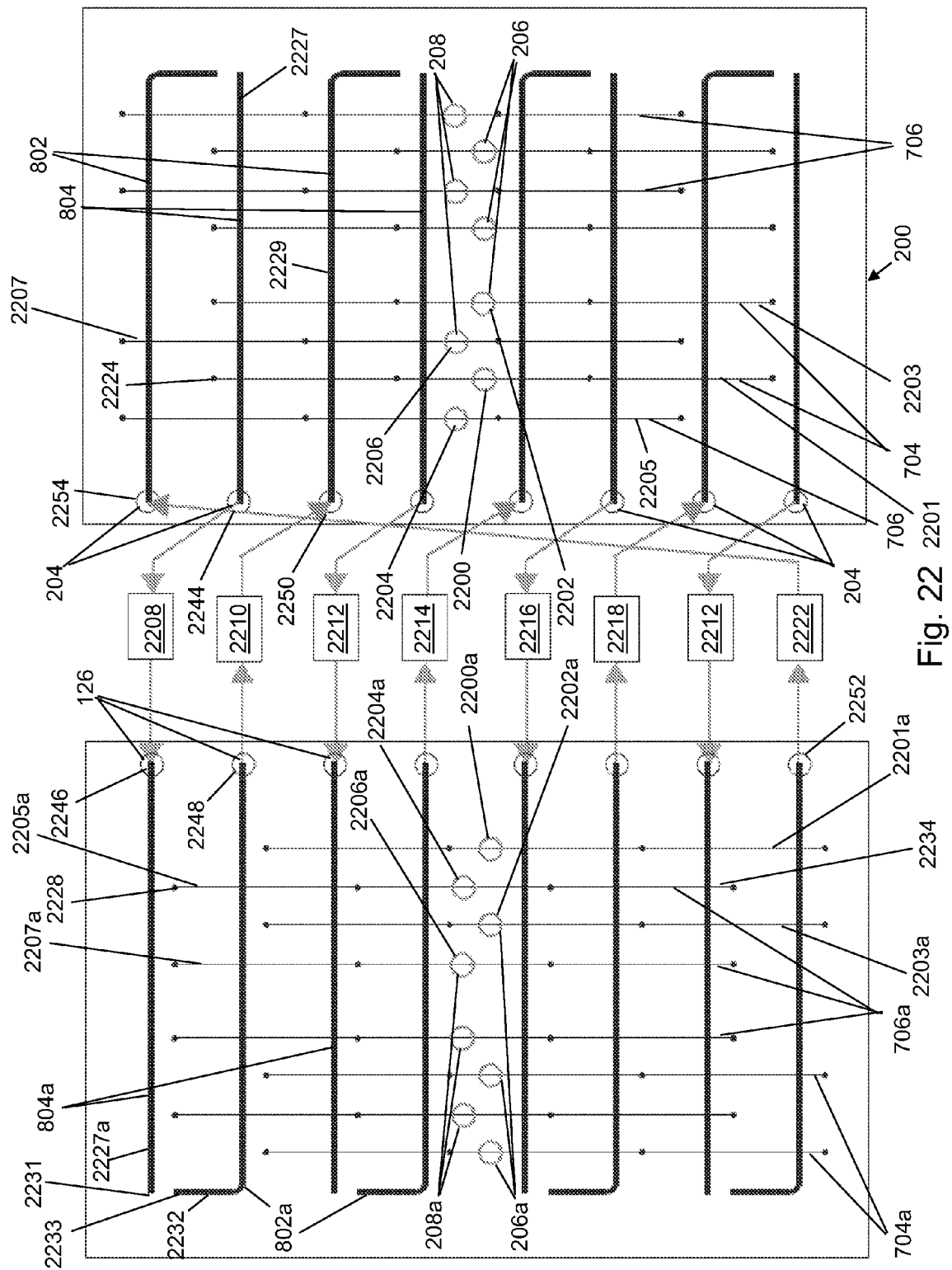
FIG. 22 illustrates the fluidics flow between the left and the right valve block assemblies in accordance with an exemplary embodiment.

With reference to FIG. 22, the fluid flow between the left valve block assembly and right valve block assembly 200 is shown in accordance with an exemplary embodiment. The functional elements of port plate 202 and fluidics stack assembly 302 of both the left valve block assembly and right valve block assembly 200 are shown with the ability to "see through" port plate 202 and fluidics stack assembly 302. Right valve block assembly 200 includes the plurality of inlet port connectors 206, the plurality of outlet port connectors 208, the second plurality of column port connectors 204, the plurality of inlet port channels 704, the plurality of outlet port channels 706, the first plurality of channels 802, and the second plurality of channels 804. The left valve block assembly includes a second plurality of inlet port connectors 206a, a second plurality of outlet port connectors 208a, the first plurality of column port connectors 126, a second plurality of inlet port channels 704a, a second plurality of outlet port channels 706a, a third plurality of channels 802a, and a fourth plurality of channels 804a.

With reference to the exemplary fluid flow configuration of FIG. 22, the plurality of inlet port connectors 206 includes a first inlet port connector 2200 and a second inlet port connector 2202. First inlet port connector 2200 is connected to a first container containing feed through one of the four inlet port connectors 128. Second inlet port connector 2202 is connected to a second container containing desorbent through a second one of the four inlet port connectors 128. The plurality of outlet port connectors 208 includes a first outlet port connector 2204 and a second outlet port connector 2206. First outlet port connector 2204 is connected to a first container collecting extract through one of the four outlet port connectors 130. Second outlet port connector 2206 is connected to a second container collecting raffinate through a second one of the four outlet port connectors 130. The second plurality of inlet port connectors 206a includes a first inlet port connector 2200a connected to a first container containing feed through one of the four inlet port connectors 128, and a second inlet port connector 2202a connected to a second container containing desorbent through a second one of the four inlet port connectors 128. The second plurality of outlet port connectors 208a includes a first outlet port connector 2204a connected to a first container collecting extract through one of the four outlet port connectors 130, and a second outlet port connector 2206a connected to a second container collecting raffinate through a second one of the four outlet port connectors 130.

The plurality of inlet port channels 704 includes a first inlet port channel 2201 through which the feed flows and a second inlet port channel 2203 through which the desorbent flows, and the plurality of outlet port channels 706 includes a first outlet port channel 2205 through which the extract flows and a second outlet port channel 2207 through which the raffinate flows. The second plurality of inlet port channels 704a includes a third inlet port channel 2201a through which the feed flows and a fourth inlet port channel 2203a through which the desorbent flows, and the second plurality of outlet port channels 706a includes a third outlet port channel 2205a through which the extract flows and a fourth outlet port channel 2207a through which the raffinate flows.

The first plurality of channels 802 connect to the second plurality of column port connectors 204 which connect to an output side of a column. The second plurality of channels 804 connect to the second plurality of column port connectors 204 which connect to an input side of a column. The third plurality of channels 802a connect to the first plurality of column port connectors 126 which connect to an input side of a column. The fourth plurality of channels 804a connect to the first plurality of column port connectors 126 which connect to an output side of a column. In the exemplary embodiment of FIG. 22, SMB system 100 includes a first column 2208, a second column 2210, a third column 2212, a fourth column 2214, a fifth column 2216, a sixth column 2218, a seventh column 2220, and an eighth column 2222.

As an example to illustrate fluid flow between right valve block assembly 200 and the left valve block assembly, feed flows into first inlet port connector 2200 under control of a pump and into first inlet port channel 2201. If the valve associated with a first inlet hole 2224 opens, the feed flows between first hole 904 and the corresponding second hole 906 and into a first channel 2227 of the second plurality of channels 804. First channel 2227 flows into a first column port connector 2244 of the second plurality of column port connectors 204 if the remaining valves associated with first channel 2227 are closed, through first column 2208, into a second column port connector 2246 of the first plurality of column port connectors 126, and onto a second channel 2227a of the fourth plurality of channels 804a. The feed can then flow onto one of the second plurality of outlet port channels 706a or onto a third channel 2232 of the third plurality of channels 802a. For example, if the valve associated with a first outlet hole 2228 opens, the feed flows between first hole 904 and the corresponding second hole 906 and into a fourth channel 2234 of the plurality of outlet port channels 706a and out of first outlet port connector 2204a.

As another example, second channel 2227a can connect to third channel 2232 of the third plurality of channels 802a by opening the valve associated with an end 2231 of second channel 2227a and an end 2233 of third channel 2232. Such a valve can thus act as a shutoff between columns. End 2231 of second channel 2227a corresponds to a second end 808 of a channel of the fourth plurality of channels 804a. End 2233 of third channel 2232 corresponds to a second end 812 of a channel of the third plurality of channels 802a. First hole 904 and the corresponding second hole 906 associated with end 2233 of third channel 2232 and end 2231 of second channel 2227a, respectively, are part of the first subset of holes 908 of the plurality of pairs of holes 902. If feed flows onto third channel 2232, the feed flows through a third column port connector 2248 of the first plurality of column port connectors 126, through second column 2210, into a fourth column port connector 2250 of the second plurality of column port connectors 204, and onto a fourth channel 2229 of the first plurality of channels 802. In this manner, fluid flow into the plurality of inlet port channels 704, out of the plurality of outlet port channels 706, and through the plurality of columns can be controlled in any number of ways by opening and closing the appropriate valves. Eighth column 2222 connects between a fifth column port connector 2252 of the first plurality of column port connectors 126 and a sixth column port connector 2254 of the second plurality of column port connectors 204 to provide a continuous loop across the plurality of columns.

Thus, each column of the plurality of columns has a total of nine valves associated with it: four to control flow from the plurality of inlet port channels 704 (the second plurality of inlet port channels 704a); four to control flow to the plurality of outlet port channels 706 (the second plurality of outlet port channels 706a); and one shutoff valve which controls flow between the first plurality of channels 802 and the second plurality of channels 804 (the third plurality of channels 802a and the fourth plurality of channels 804a). Fluid flows into the fluidics system through one of the plurality of inlet port connectors 206 (the second plurality of inlet port connectors 206a) and migrates through the fluidics system depending on which valve ports are open.

The valve block assemblies disclosed herein may be configured for a variety of separation modes. In one aspect, the assemblies are configured for standard SMB. Standard SMB involves the use of two inlet ports (feed, desorbent) and two outlet ports (extract, raffinate). Four chromatographic zones may be established as determined by the location of the inlet and outlet ports. Zone 1 is defined as the zone between the desorbent inlet and the extract outlet. Zone 2 is defined as the zone between the extract outlet and the feed inlet. Zone 3 is defined as the zone between the feed inlet and raffinate outlet. Zone 4 is defined as the zone between the raffinate outlet and desorbent inlet. In standard SMB, all zones are connected to form a continuous loop. By way of example only, in an eight-column system (as shown in FIG. 22) with two columns in each zone, a total of twelve valves would be open at any one time in the cycle: the desorbent, extract, feed, and raffinate valves and the eight shutoff valves.

In a variation on standard SMB mode, certain chromatographic zones may be eliminated by closing the appropriate shutoff valves. By way of example only, Zone 4 may be eliminated by closing the shutoff valve between Zones 1 and 3. In an eight-column system (as shown in FIG. 22), with three columns in Zone 1, two columns in Zone 2, and three columns in Zone 3, a total of eleven valves would be open at any one time: the desorbent, extract, feed, and raffinate valves and seven shutoff valves (the shutoff valve between Zones 1 and 3 is closed).

In another aspect, the assemblies are configured for step protocols. By step protocols, it is meant that one or more isolated chromatographic zones are established in the assembly by closing the appropriate shutoff valves and activating additional pumps. Isolation of chromatographic zones enables the flow rate and other separation conditions of one zone to be adjusted independently of another zone. By way of example only, in an eight-column system (as shown in FIG. 22), with two columns in each zone and four isolated zones, a total of twelve valves would be open at any one time during the separation cycle: the feed, desorbent, Aux 1 IN, Aux 2 IN, extract, raffinate, Aux 1 OUT, Aux 2 OUT, and four shutoff valves (the shutoff valves between each zone are closed). Aux 1 IN and Aux 2 IN may be provided by the remaining inlet port connectors of the plurality of inlet port connectors 128, and Aux 1 OUT and Aux 2 OUT may be provided by the remaining outlet port connectors of the plurality of outlet port connectors 130. As an example, continuous step protocols can be devised by switching the column ports at periodic intervals analogous to SMB mode operation.

In another aspect, the assemblies are configured to incorporate one or more additional pumps to control internal zone flow rates. During SMB separations, multiple pumps may be employed to control flow rates of external inlet and outlet streams, as well as internal zone flow rates. By way of example, in many SMB systems a recirculating pump is employed in zone 4 to conserve desorbent and enable greater concentration of extract and raffinate solutes. Following this example, SMB system 100 can incorporate an internal recirculating pump into an SMB protocol by connecting an Aux 1 OUT outlet connector to the inlet side of a pump, connecting the pump outlet to an Aux 2 IN inlet port connector, closing the shutoff valve of a column in zone 4, opening the same column's Aux 1 OUT valve, and opening the downstream column's Aux 2 IN valve. Activating this pump in the SMB cycle provides the greater ability to control the flow rate for desorbent in zone 4 that is pumped into zone 1. Similar internal flow loops may be employed in other zones.

In yet another aspect, the assemblies are configured for a combination of standard SMB and step protocols. By way of example only, an isolated zone may be included in a two-column section of an eight-column system, with the other six employed in standard SMB mode. The isolated two-column section may be used for cleaning the columns.

In yet another aspect, the assemblies are configured for gradient protocols. By gradient protocols, it is meant that one or more chromatographic zones are established in which solvent gradients are applied through the use of multiple pump heads and standard mixing procedures. For example, a linear salt gradient can be created by pumping two source solutions containing different salt concentrations through a mixer and into a system inlet port. During the process, the ratio of the source solutions is continuously adjusted by varying the pump flow rates via programming software to enable the formation of an increasing or decreasing salt concentration in the solvent delivered to the system.

In yet a further aspect, the assemblies are configured for standard, fixed-bed column chromatography. By opening and closing appropriate valves, a single column or multiple columns may also be run on SMB system 100 using standard protocols known in the art. By way of example only, from one to eight columns could be employed in a non-continuous mode by opening one appropriate inlet upstream of the first column, the appropriate shutoff valves, and one outlet valve downstream of the last column. Input solutions (for example feedstock, wash solutions, desorbent, salt gradients, pH gradients, regeneration solutions) can be pumped sequentially through the column series to effect separation.

Any of these separation modes may be combined with the appropriate column types to achieve virtually any type of liquid chromatographic separation, including, but not limited to affinity chromatography, ion-exchange chromatography, size exclusion chromatography, and hydrophobic interaction chromatography.

Figure 23:
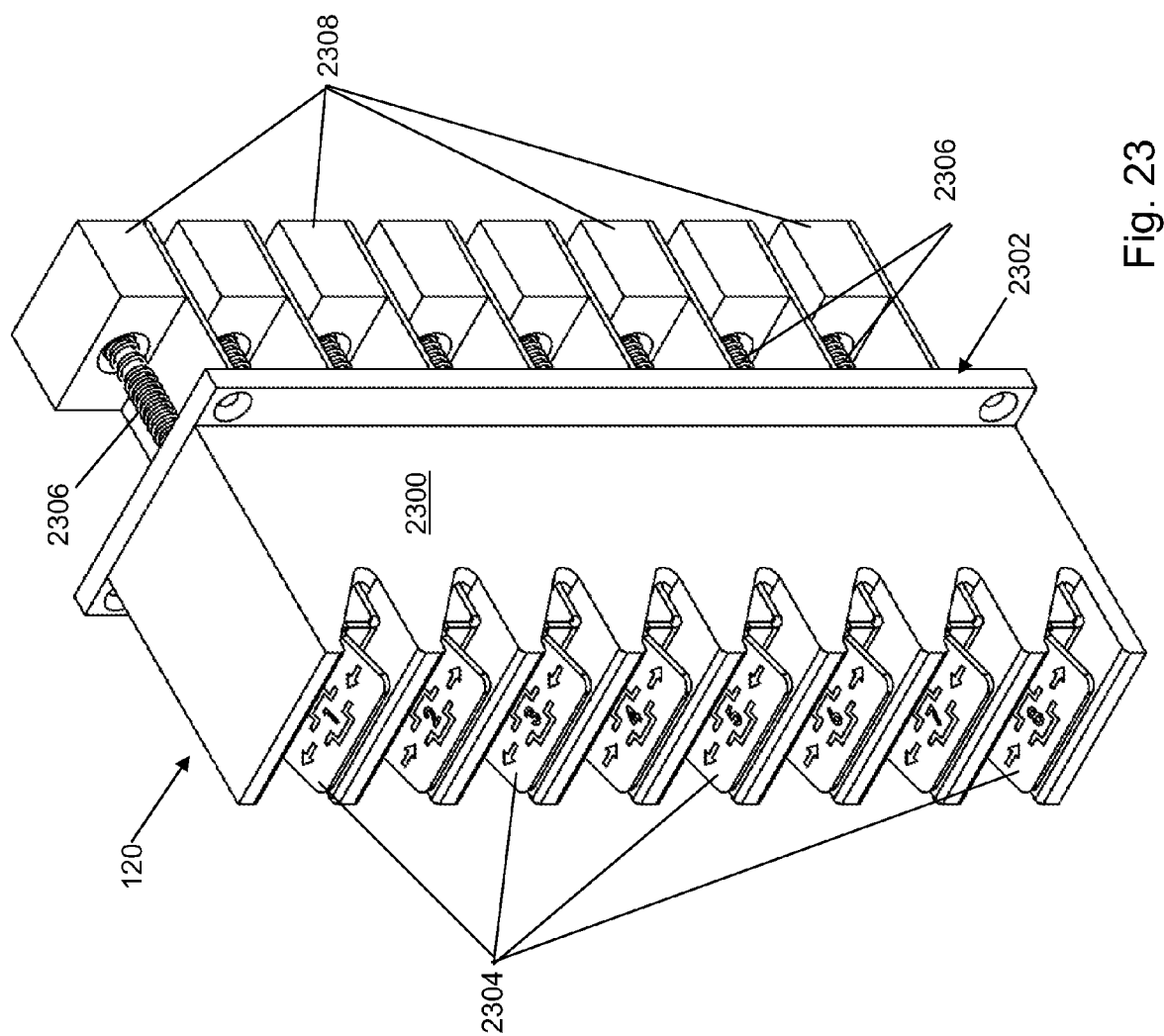
FIG. 23 shows a front side, perspective view of a column rack assembly of the SMB system of FIG. 1 in accordance with an exemplary embodiment.

With reference to FIG. 23, a front side, perspective view of column rack assembly 120 is shown in accordance with an exemplary embodiment. Column rack assembly 120 may include a rack 2300, a mounting plate 2302, a plurality of clamping drawers 2304, a plurality of springs 2306, and a plurality of spring blocks 2308. In an exemplary embodiment, rack 2300 may be formed of nylon. In the exemplary embodiment of FIGS. 1 and 23, column rack assembly 120 provides mounting locations for eight chromatographic columns. As a result, column rack assembly 120 includes eight clamping drawers, eight springs, and eight spring blocks.

Figure 24:
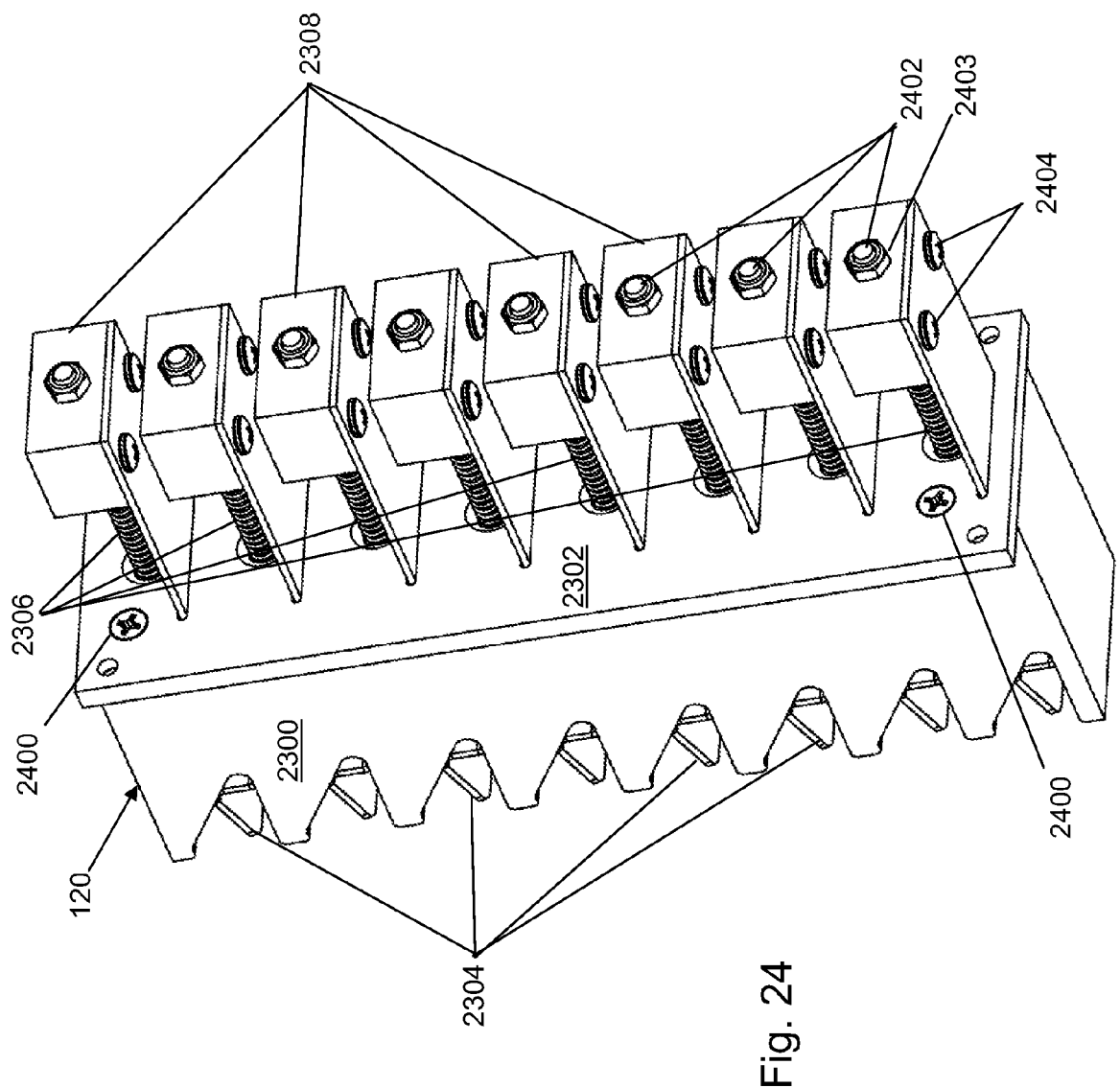
FIG. 24 shows a back side, perspective view of the column rack assembly of FIG. 23 in accordance with an exemplary embodiment.

With reference to FIG. 24, a back side, perspective view of column rack assembly 120 is shown in accordance with an exemplary embodiment. Column rack assembly 120 may further include a plurality of plate mounting screws 2400, a plurality of spring block screws 2402, and a plurality of spring block mounting screws 2404. The plurality of plate mounting screws 2400 mount rack 2300 to mounting plate 2302. The plurality of spring block screws 2402 mount a spring of the plurality of springs 2306 to a spring block of the plurality of spring blocks 2308 such that each spring is mounted to a spring block using a nut 2403. A spring of the plurality of springs 2306 is positioned on or mounted to extend around each of the plurality of spring block screws 2402. In an exemplary embodiment, the spring may be a compression spring having a compression force of three pounds per inch. The plurality of spring block mounting screws 2404 mount a spring block of the plurality of spring blocks 2308 to a clamping drawer of the plurality of clamping drawers 2304 such that each spring block is mounted to a clamping drawer.

Figure 25:
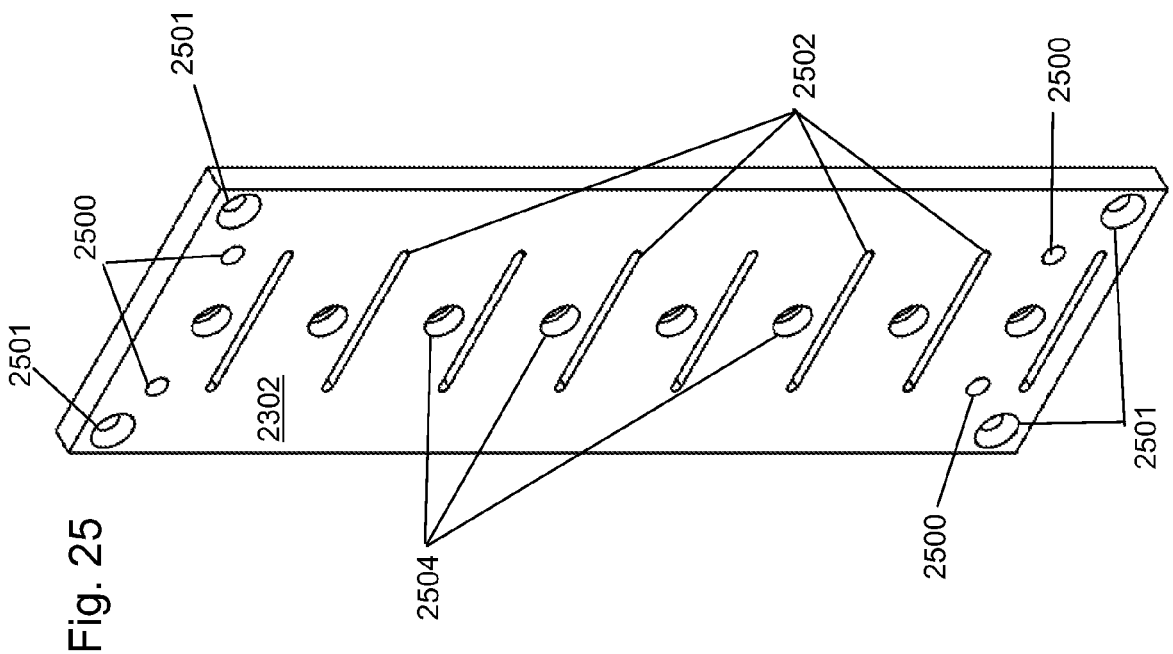
FIG. 25 shows a front side, perspective view of a mounting plate of the column rack assembly of FIG. 23 in accordance with an exemplary embodiment.

With reference to FIG. 25, a front side, perspective view of mounting plate 2302 of column rack assembly 120 is shown in accordance with an exemplary embodiment. In an exemplary embodiment, mounting plate 2302 may be formed of nylon. Mounting plate 2302 may include a first plurality of mounting holes 2500, a second plurality of mounting holes 2501, a plurality of slots 2502, and a plurality of spring through-holes 2504. The plurality of plate mounting screws 2400 extend through the first plurality of mounting holes 2500 to mount rack 2300 to mounting plate 2302. A second plurality of mounting screws (not shown) extend through the second plurality of mounting holes 2501 to mount column rack assembly 120 to valve block panel 108. A clamping drawer of the plurality of clamping drawers 2304 fits through a slot of the plurality of slots 2502. A spring of the plurality of springs 2306 extends through a spring through-hole of the plurality of spring through-holes 2504. In the exemplary embodiment of FIG. 25, mounting plate 2302 includes eight slots and eight spring through-holes.

Figure 26:
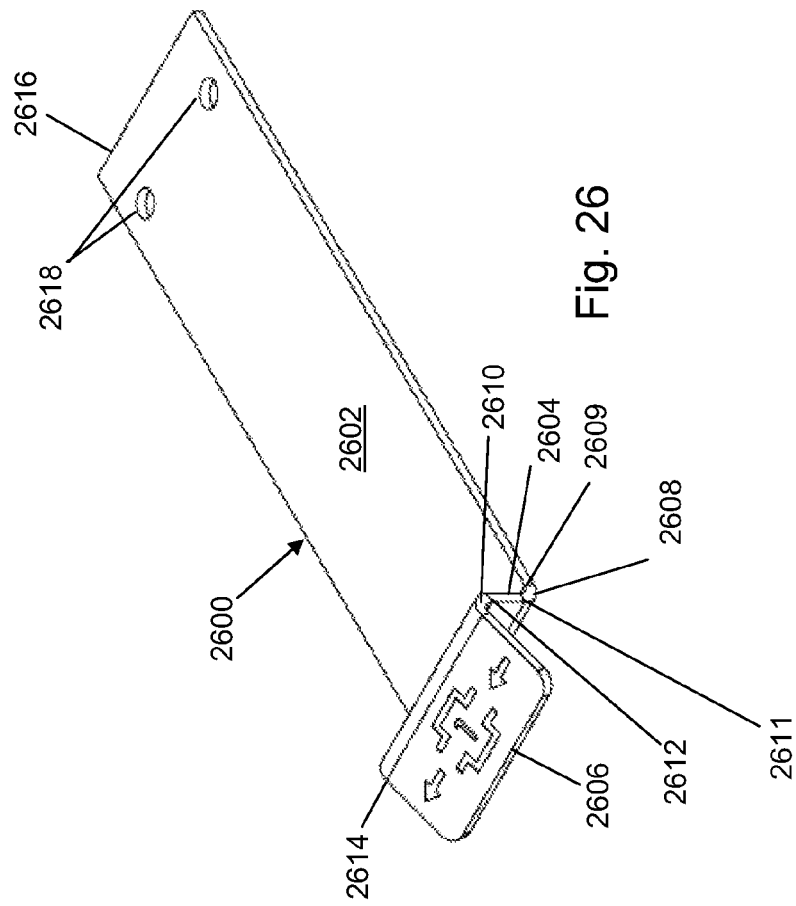
FIG. 26 shows a front side, perspective view of a clamping drawer of the column rack assembly of FIG. 23 in accordance with an exemplary embodiment.

With reference to FIG. 26, a top side, perspective view of a clamping drawer 2600 of the plurality of clamping drawers 2304 is shown in accordance with an exemplary embodiment. Clamping drawer 2600 may include a first plate 2602, a second plate 2604, and a third plate 2606. First plate 2602 includes a first edge 2609 and a second edge 2616 opposite first edge 2608. Second plate 2604 includes a third edge 2611 and a fourth edge 2612 opposite third edge 2611. Third plate 2606 includes a fifth edge 2614. A first corner 2608 mounts second plate 2604 to first plate 2602 such that second plate 2604 extends in a generally perpendicular direction between first edge 2609 of first plate 2602 and third edge 2611 of second plate 2604. A second corner 2610 mounts third plate 2606 to second plate 2604 such that third plate 2606 extends from second plate 2604 between fourth edge 2612 of second plate 2604 and fifth edge 2614 of third plate 2606. Clamping drawer 2600 may be formed of a single or multiple pieces of material without limitation. In an exemplary embodiment, clamping drawer 2600 is formed of stainless steel, and second corner 2610 forms an approximately 70 degree angle between third plate 2606 and second plate 2604 such that third plate 2606 extends from second plate 2604 in a direction opposite the direction that first plate 2602 extends from second plate 2604. First plate 2602 further includes a plurality of holes 2618 though a single hole may be used. One or more of the plurality of spring block mounting screws 2404 extend through the plurality of holes 2618 of each clamping drawer 2600 to mount clamping drawer 2600 to a spring block of the plurality of spring blocks 2308.

With reference to FIG. 27, a cross-sectional view of rack 2300 of column rack assembly 120 is shown in accordance with an exemplary embodiment. Rack 2300 may include a plurality of shelves 2700. In the exemplary embodiment of FIG. 25, rack 2300 includes eight shelves which have a generally triangular cross sectional shape though other shapes may be used including circular and rectangular. Associated with each of the plurality of shelves 2700 may be a spring channel 2702 and a clamping drawer channel 2704. Spring channel 2702 may include a first channel portion 2706 and a second channel portion 2708 which abut each other at a transition channel portion 2710. First channel portion 2706 has a larger diameter than second channel portion 2708. First channel portion 2706 is sized and shaped to accommodate a spring of the plurality of springs 2306. Second channel portion 2708 is sized and shaped to accommodate a spring block screw of the plurality of spring block screws 2402, but not to accommodate a spring of the plurality of springs 2306. Thus, an end of a spring of the plurality of springs 2306 is positioned to press against transition channel portion 2710 between first channel portion 2706 and second channel portion 2708. Clamping drawer channel 2704 is sized and shaped to accommodate clamping drawer 2600.

With reference to FIG. 28, a front, skeleton view of spring block 2308 of column rack assembly 120 is shown in accordance with an exemplary embodiment. With reference to FIG. 29, a bottom, skeleton view of spring block 2308 is shown in accordance with an exemplary embodiment. With reference to FIGS. 28 and 29, spring block 2308 may include a front face 2800, a second spring channel 2801, a first mounting screw channel 2808, a second mounting screw channel 2810, and a bottom face 2900. Front face 2800 may include second spring channel 2801. Second spring channel 2801 extends through spring block 2308 from front face 2800 to a back face (not shown). Second spring channel 2801 may include a first channel portion 2802, a second channel portion 2804, a third channel portion 2806, and a fourth channel portion 2807 which abut each other to form a single channel having different diameters. First channel portion 2802 has a sloped wall which slopes from a first diameter to a second diameter that is smaller in diameter than the first diameter. Second channel portion 2804 has the second diameter. Third channel portion 2806 has a second sloped wall which slopes from the second diameter to a third diameter that is smaller in diameter than the second diameter. Fourth channel portion 2807 has the third diameter. First channel portion 2802 and second channel portion 2804 are sized and shaped to accommodate a spring of the plurality of springs 2306. Third channel portion 2806 and fourth channel portion 2807 are sized and shaped to accommodate a spring block screw of the plurality of spring block screws 2402, but not to accommodate a spring of the plurality of springs 2306. Thus, an end of a spring of the plurality of springs 2306 is positioned to press against third channel portion 2806.

Bottom face 2900 may include first mounting screw channel 2808 and a second mounting screw channel 2810. First mounting screw channel 2808 and a second mounting screw channel 2810 extend into spring block 2308 on either side of second spring channel 2801. First mounting screw channel 2808 and a second mounting screw channel 2810 are sized and shaped to accommodate a spring block mounting screw of the plurality of spring block mounting screws 2404 to mount spring block 2308 and clamping drawer 2600 together.

Thus, a spring of the plurality of springs 2306 is mounted at one end to rack 2300 and at the other end to spring block 2308. Spring block 2308 is further mounted to clamping drawer 2600 which extends through clamping drawer channel 2704 of rack 2300 and through a slot of the plurality of slots 2502 of mounting plate 2302. Due to the tension of the spring, clamping drawer 2600 is held against rack 2300 in a shelf of the plurality of shelves 2700. A user can withdraw clamping drawer 2600 by pulling against the tension of the spring and position a chromatographic column within the shelf. The user releases clamping drawer 2600 which holds the chromatographic column in position against rack 2300. Column rack assembly 120 can accommodate a variety of differently sized and shaped chromatographic columns.

The word "exemplary" is used herein to mean serving as an example, instance, or illustration. Any aspect or design described herein as "exemplary" is not necessarily to be construed as preferred or advantageous over other aspects or designs. Further, for the purposes of this disclosure and unless otherwise specified, "a" or "an" means "one or more". The exemplary embodiments may be implemented as a method, machine, or article of manufacture using standard programming and/or engineering techniques to produce software, firmware, hardware, and/or any combination thereof to control a device to implement the disclosed embodiments.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A valve block assembly comprising:
   a fluidics stack assembly comprising:
   an input/output (I/O) plate comprising an inlet port hole extending through the I/O plate and an outlet port hole extending through the I/O plate;
   a fluidics plate comprising:
      a first surface comprising an inlet channel formed in the first surface and an outlet hole extending through the fluidics plate, wherein the inlet channel includes an inlet hole extending through the fluidics plate; and
      a second surface comprising the inlet hole, the outlet hole, and a first channel formed in the second surface; and
   a seal plate comprising a first hole extending through the seal plate and a second hole extending through the seal plate;
   a membrane; and
   a pressure cup plate comprising a pressure cup, wherein the pressure cup comprises:
      an o-ring;
      a channel formed in a surface of the pressure cup plate to surround a first portion of the surface, wherein the channel is configured to hold the o-ring; and
      a first pressure port extending through a body and opening into the first portion of the surface; and
   wherein the fluidics stack assembly, the membrane and the surface of the pressure cup plate are aligned and mounted to form a sealing surface between the I/O plate and the fluidics plate, between the fluidics plate and the seal plate, between the seal plate and the membrane, and between the membrane and the surface of the pressure cup plate; and
   further wherein, when aligned, the inlet port hole aligns with the inlet channel, the inlet hole aligns with the first hole, the outlet port hole aligns with the outlet hole, and the second hole aligns with the first channel, and the first portion of the surface of the pressure cup plate surrounds the first hole and the second hole to support fluid communication between the inlet port hole and the outlet port hole under control of pressure changes within the first pressure port.

2. The valve block assembly of claim 1, further comprising a second pressure port extending through the body and opening into the channel of the pressure cup, wherein a pneumatic pressure within the second pressure port is controlled to hold the o-ring in the channel when a second pressure within the first pressure port changes.

3. The valve block assembly of claim 1, further comprising a vent channel formed in the surface of the body to extend between the channel of the pressure cup and a hole or edge of the pressure cup plate.

4. The valve block assembly of claim 1, wherein the I/O plate, the fluidics plate, and the seal plate are diffusion bonded together.

5. The valve block assembly of claim 1, wherein the I/O plate further comprises a second inlet port hole extending through the I/O plate and a second outlet port hole extending through the I/O plate.

6. The valve block assembly of claim 5, wherein the first surface of the fluidics plate further comprises a second inlet channel formed in the first surface and a second outlet hole extending through the fluidics plate, wherein the second inlet channel includes a second inlet hole extending through the fluidics plate.

7. The valve block assembly of claim 6, wherein the second surface of the fluidics plate further comprises the second inlet hole, the second outlet hole, and a second channel formed in the second surface, wherein the second channel includes the second inlet hole.

8. The valve block assembly of claim 7, wherein the seal plate further comprises a third hole extending through the seal plate and a fourth hole extending through the seal plate.

9. The valve block assembly of claim 8, wherein, when aligned, the second inlet port hole aligns with the second inlet channel, the second inlet hole aligns with the fourth hole, the second outlet port hole aligns with the second outlet hole, and the third hole aligns with the second channel to support fluid communication between the second inlet port hole and the second outlet port hole.

10. The valve block assembly of claim 9, wherein the seal plate further comprises a fifth hole extending through the seal plate and a sixth hole extending through the seal plate.

11. The valve block assembly of claim 10, wherein, when aligned, the fifth hole aligns with the second channel of the fluidics plate and the sixth hole aligns with the first channel of the fluidics plate to support fluid communication between the inlet port hole and the outlet port hole.

* * * * *